United States Patent
Niigaki et al.

(10) Patent No.: US 12,094,153 B2
(45) Date of Patent: Sep. 17, 2024

(54) POINT CLOUD ANALYSIS DEVICE, METHOD, AND PROGRAM

(71) Applicant: NIPPON TELEGRAPH AND TELEPHONE CORPORATION, Tokyo (JP)

(72) Inventors: Hitoshi Niigaki, Tokyo (JP); Yasuhiro Yao, Tokyo (JP); Masaaki Inoue, Tokyo (JP); Tomoya Shimizu, Tokyo (JP); Yukihiro Goto, Tokyo (JP); Shigehiro Matsuda, Tokyo (JP); Ryuji Honda, Tokyo (JP); Hiroyuki Oshida, Tokyo (JP); Kana Kurata, Tokyo (JP); Shingo Ando, Tokyo (JP); Atsushi Sagata, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 377 days.

(21) Appl. No.: 17/608,963

(22) PCT Filed: May 8, 2019

(86) PCT No.: PCT/JP2019/018449
§ 371 (c)(1),
(2) Date: Nov. 4, 2021

(87) PCT Pub. No.: WO2020/225886
PCT Pub. Date: Nov. 12, 2020

(65) Prior Publication Data
US 2022/0215572 A1 Jul. 7, 2022

(51) Int. Cl.
*G06T 7/70* (2017.01)
*G06T 7/00* (2017.01)

(52) U.S. Cl.
CPC .............. *G06T 7/70* (2017.01); *G06T 7/0002* (2013.01); *G06T 2207/10028* (2013.01)

(58) Field of Classification Search
CPC ..................... G06T 7/70; G06T 7/0002; G06T 2207/10028; G06T 2207/30184; G06T 7/11; G01C 15/00
See application file for complete search history.

(56) References Cited

U.S. PATENT DOCUMENTS 10,699,167 B1 * 6/2020 Dowdall .............. G06F 18/2178
10,807,236 B2 * 10/2020 Qi ........................... B25J 9/1694
(Continued)

FOREIGN PATENT DOCUMENTS

| JP | 20151901 A | 1/2015 |
| JP | 6186305 B2 | 8/2017 |

OTHER PUBLICATIONS

Schnabel et al. (2007) "Efficient RANSAC for Point-Cloud Shape Detection" Computer Graphics Forum, Jun. 2007.

*Primary Examiner* — Wesley J Tucker

(57) ABSTRACT

Provided is a point cloud analysis device that curbs a decrease in model estimation accuracy due to a laser measurement point cloud. A clustering unit (30) clusters a point cloud representing a three-dimensional point on an object obtained by a measurement unit mounted on a moving body and performing measurement while scanning a measurement position, within a scan line, to obtain a point cloud cluster. A central axis direction estimation unit (32) estimates a central axis direction based on the point cloud cluster. A direction-dependent local effective length estimation unit (34) estimates a local effective length based on an estimated central axis direction and an interval of scan lines, the local effective length being a length when a length of projection of the point cloud cluster in a central axis direc- (Continued)

tion for each of the point cloud clusters is interpolated by an amount of a loss part of the point cloud.

17 Claims, 28 Drawing Sheets

(56) References Cited

U.S. PATENT DOCUMENTS

| | | | | |
|---|---|---|---|---|
| 11,222,204 | B2* | 1/2022 | Wagner | G01C 11/025 |
| 2019/0311546 | A1* | 10/2019 | Tay | G05D 1/0088 |
| 2019/0323844 | A1* | 10/2019 | Yendluri | G01S 17/86 |
| 2020/0202107 | A1* | 6/2020 | Ozkucur | G01S 7/4808 |
| 2022/0198749 | A1* | 6/2022 | Lee | G06T 17/05 |
| 2022/0282967 | A1* | 9/2022 | Putz | G01C 21/1656 |
| 2022/0327779 | A1* | 10/2022 | Inoue | G01C 15/00 |
| 2023/0162442 | A1* | 5/2023 | Itakura | G06T 7/60 |
| | | | | 345/419 |
| 2023/0260216 | A1* | 8/2023 | Niigaki | G06T 7/194 |
| | | | | 345/419 |
| 2023/0419659 | A1* | 12/2023 | Uljanovs | G06V 10/36 |

* cited by examiner

POINT CLOUD ANALYSIS DEVICE, METHOD, AND PROGRAM

CROSS-REFERENCE TO RELATED APPLICATIONS

This application is a U.S. 371 Application of International Patent Application No. PCT/JP2019/018449, filed on 8 May 2019, the disclosure of which is hereby incorporated herein by reference in its entirety.

TECHNICAL FIELD

The present invention relates to a point cloud analysis device, method, and program, and more particularly, to a point cloud analysis device, method, and program for modeling a linear structure from a point cloud consisting of three-dimensional points.

BACKGROUND ART

Use of a system capable of measuring a shape of a surface of an object such as a building that is a structure near a road or a road by a vehicle with a camera or a laser scanner, called a mobile mapping system (MMS), while traveling around a city has become widespread. This system can record the surface of the object as three-dimensional coordinate information using the Global Positioning System (GPS) or an inertial measurement unit (IMS). Applications using this technology in maintenance work such as creating a three-dimensional facility map through detection of structures near a road and checking past and present shape changes (aging) are expected. Here, the three-dimensional coordinate information is three-dimensional coordinate information corresponding to a position in a real space, and a relative position in the coordinate information corresponds to a positional relationship in the real space.

Research on a technology in which the MMS travels outdoors and laser measurement is performed such that a surface shape of an infrastructure structure (hereinafter referred to as a subject) can be recorded with millimeter-level accuracy, and an amount of deformation of a columnar structure (a utility pole) can be automatically acquired as in Patent Literature 1 is being performed. In this patent technology, a cylindrical model (central axis is a polynomial curve) flexed with respect to a measured point cloud is subjected to model fitting through random sample consensus (RANSAC), and a model parameter can be estimated accurately.

In robust estimation through RANSAC of the related art, the model parameter is estimated using an output value of an evaluation function (hereinafter referred to as an evaluation score) that is a model fitting score. For example, for the evaluation score, the number of points present on a model surface, an area of the model surface on which the points are present, and the like are used as indexes. RANSAC is a technology that can estimate a model (parameter) robustly against noise by repeating a hypothesis generation process and an evaluation process using a sampled point cloud. Using RANSAC, even in a situation in which there is much noise that is outliers, an accurate shape can be estimated when there are relatively many point clouds on a model surface that are inliers. Further, when an evaluation score of a model estimated through RANSAC is equal to or higher than a threshold value determined by a user, a determination can be made that the model exists. For example, when the evaluation score is set as the number of points, a model is determined to be a correct model when a larger number of points are on a surface of the model.

Further, when a wide range of measurement data is targeted as when outdoors, there is a known problem of having difficulty in setting an evaluation score due to the change in the density of measured point cloud data (FIG. 1) even in the same linear structure such as branch lines that support a utility pole or a power line or a communication cable between utility poles, which is caused by the change in a measured area or the number of point clouds of the same subject depending on a relative position and a relative posture between a measurement position and a subject. Here, FIG. 1 is an image diagram of fixed laser measurement when a utility pole and a branch line are viewed from above. A white circle indicates a measurement point, and $\theta$ indicates an interval between laser measurement angles. Thus, an interval of measured point clouds changes depending on a distance from the measurement position and the posture of the subject.

In response to this problem, in the related art, there is a technology in which an evaluation score is not a point cloud but an area of a model surface (Non Patent Literature 2). As illustrated in FIG. 2A, for example, there is also a method of quantizing a model surface and adding an area in each quantized region as a score value depending on whether a point cloud is present in each quantized region. That is, a magnitude of the quantization is changed according to a lower limit and an upper limit between which the density changes, thereby curbing an influence of change in density. Here, FIG. 2A is an image diagram of fixed laser measurement. A white circle indicates a measurement point, and a broken line region indicates a range in which quantization is performed at regular intervals. When a point is present in the region inside the broken line, an evaluation score is set to +1 so that the score becomes constant regardless of change in point cloud density depending on a position.

CITATION LIST

Non Patent Literature

Non Patent Literature 1: Ruwen Schnabel, Roland Wahl, and Reinhard Klein, "Efficient RANSAC for Point-Cloud Shape Detection", In: Computer Graphics Forum (June 2007) 26:2(214-226)

Patent Literature

Patent Literature 1: JP 6186305 B

SUMMARY OF THE INVENTION

Technical Problem

When laser measurement is performed on an elongated structure (a linear structure) such as a branch line or a cable, it is easy for a measured area to be extremely small, and as a result, the number of points present on the model surface also decreases, and thus detection may fail (detection loss) even in robust estimation through RANSAC. Because a ratio of point clouds of an accessory or a nearby object structure to input data may be higher than that of the linear structure that is a modeling target, a false detection model tends to be accidentally estimated.

Further, a measurement target density of a subject surface varies depending on a traveling speed in MMS measurement, and a measurement condition changes such as a scan line interval being wider and the number of measurement point clouds being smaller when a speed is higher. In other words, due to non-uniform density, a quantization setting as in the related art is not clear, and accurate modeling is difficult only with application of the related art.

Further, susceptibility to not only a relative position or speed, but also a relative posture is high. For example, when an angle Θ represented by the relative posture between a laser scan surface and a central axis of the linear structure changes from Θ to 2Θ as illustrated in FIGS. 3 and 4 and a traveling distance D of the MMS is constant, the scanline interval changes from tan(2Θ) to tan(Θ). For example, when Θ=30 degrees, there is a difference of √3 (≈1.73) in the scan line interval. Further, as illustrated in FIG. 3, when a scale is small, it is difficult for a point cloud on a different scan line to be included, and when the scale is large, a point cloud on a different scan line is included, but a point cloud on a surrounding structure tends to be accidentally included.

Further, there is also an approach of directly estimating a density of a point cloud and designing an evaluation score function in consideration of an estimation result, but MMS has a problem of the difficulty in estimation due to the wide scan line interval. As illustrated in FIG. 2B, in the estimation of the density, it is necessary to increase the scale to perform the estimation for the wide scan line interval, but when there are a large number of subjects as in an urban region, a point cloud on a nearby structure is accidentally included, and thus it is difficult to estimate an accurate density.

There is a problem in that a subject such as a linear structure is difficult to measure in principle. When a width of a linear structure is narrower than an interval between laser scan points according to a distance from a measurement position, the laser may not hit a subject surface and, as a result, a data loss occurs and an evaluation score tends to be small. For a linear structure that is such an elongated subject, it is also possible to reduce the threshold value of the evaluation score in order to curb detection loss, but on the other hand, there is a problem of tendency for a false detection model to accidentally occur when such a measure is taken.

Generally, when an object detection process that is preprocessing of the model estimation process is performed, a point cloud erroneously determined to be a linear structure is included even in an object that is not originally a linear structure. Thus, when those point clouds are input, it is estimated that a model is present at a point cloud position at a position estimated by mistake. That is, when the input data contains an error at the time of detection of an object or a subject that is a modeling target has a high loss, that is, when data has tendency for a ratio of outlier point clouds to inlier point clouds to be high, the model estimation accuracy tends to decrease, and thus the threshold value of the evaluation score cannot be generally reduced.

The present invention has been made in view of the above circumstances, and an object of the present invention is to provide a point cloud analysis device, method, and program capable of curbing a decrease in model estimation accuracy due to a laser measurement point cloud.

Means for Solving the Problem

In order to achieve the above object, a point cloud analysis device according to a first aspect is a point cloud analysis device for estimating presence or absence of a linear structure or/and a region in which the linear structure is present from point cloud data obtained by measuring a real space, the point cloud analysis device including: a linear structure estimation unit configured to estimate the presence or absence of the linear structure or/and the region in which the linear structure is present from the point cloud data using a property in the real space common to the linear structure, wherein the property includes a length of the linear structure and a relationship between divided regions when the linear structure is divided into predetermined units.

A point cloud analysis method according to a second aspect is a point cloud analysis method performed by a point cloud analysis device for estimating presence or absence of a linear structure or/and a region in which the linear structure is present from point cloud data obtained by measuring a real space, the point cloud analysis method including: estimating, by a linear structure estimation unit, the presence or absence of the linear structure or/and the region in which the linear structure is present from the point cloud data using a property in the real space common to the linear structure, wherein the property includes a length of the linear structure and a relationship between divided regions when the linear structure is divided into predetermined units.

A program according to a third aspect is a program for estimating presence or absence of a linear structure or/and a region in which the linear structure is present from point cloud data obtained by measuring a real space, the program causing a computer to execute: estimating the presence or absence of the linear structure or/and the region in which the linear structure is present from the point cloud data using a property in the real space common to the linear structure, wherein the property includes a length of the linear structure and a relationship between divided regions when the linear structure is divided into predetermined units.

Effects of the Invention

As described above, according to the point cloud analysis device, method, and program according to an aspect of the present invention, it is possible to curb a decrease in model estimation accuracy due to a laser measurement point cloud.

DESCRIPTION OF EMBODIMENTS

Figure 1:
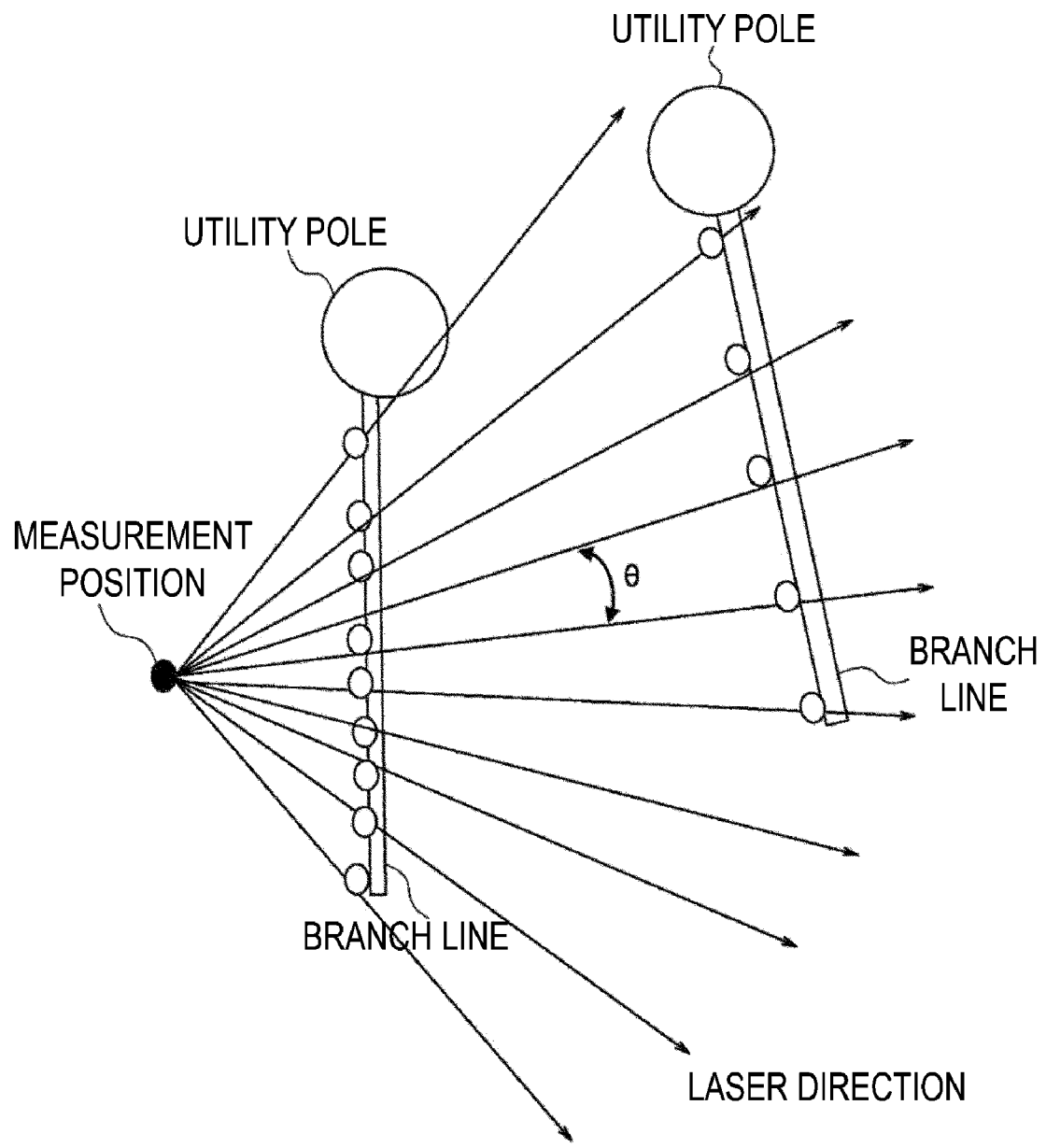
FIG. 1 is an image diagram illustrating a distance between a radar measurement position and subjects, and a distance in point cloud density.
Figure 2A:
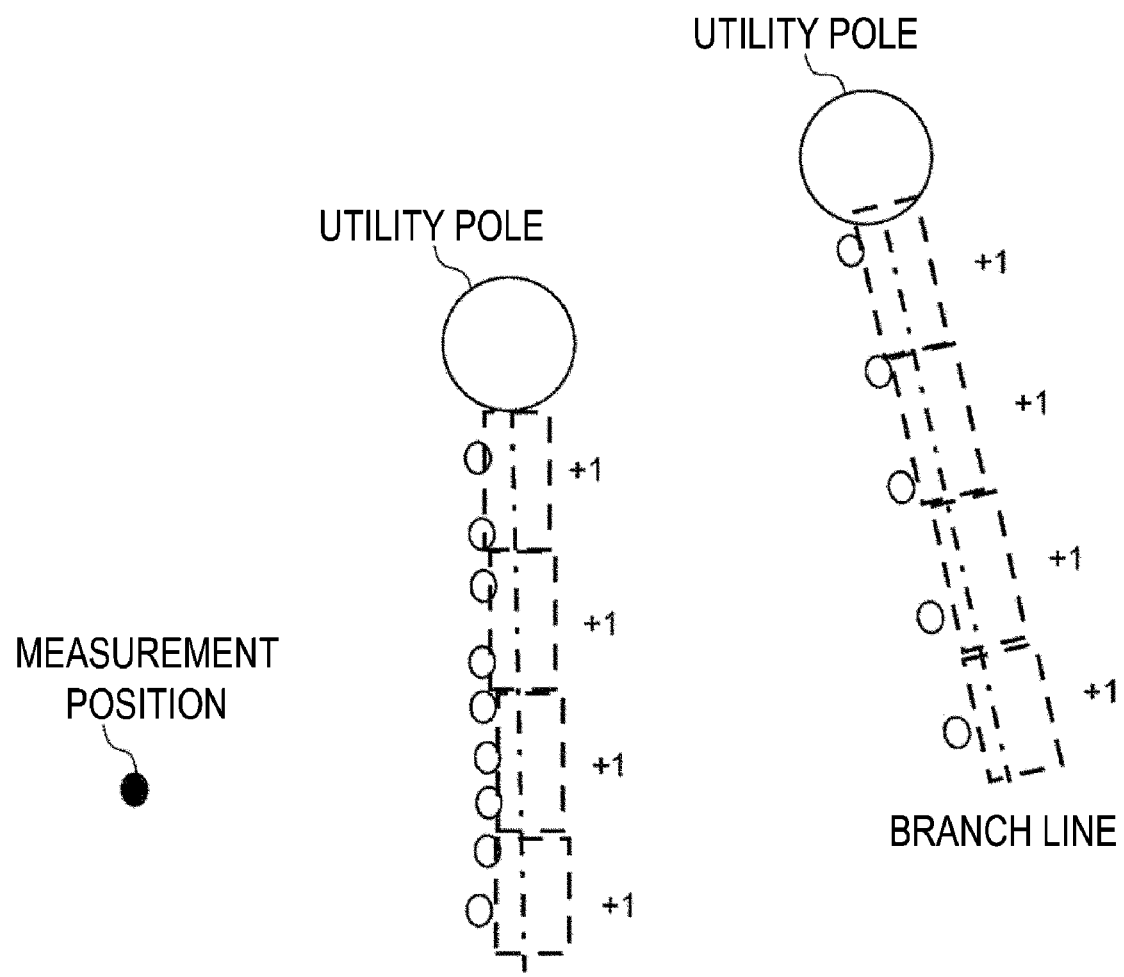
FIG. 2A is an image diagram in which a surface of a branch line is quantized in a central axis direction.
Figure 2B:
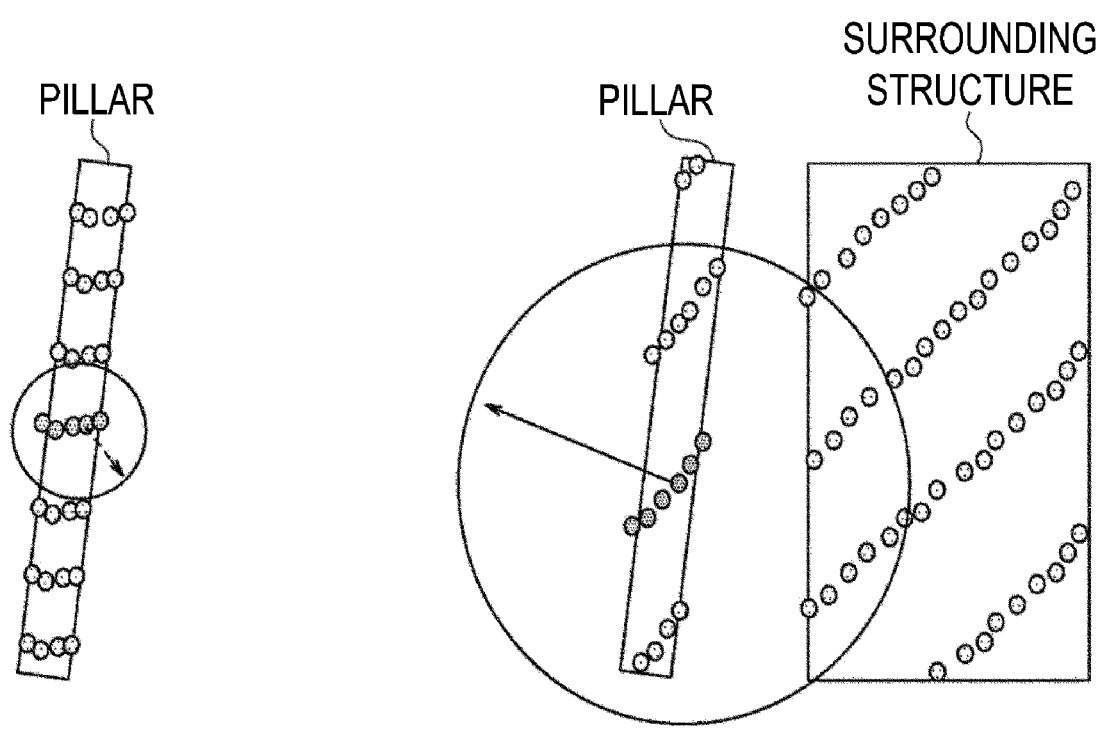
FIG. 2B is an image diagram of a case in which a scale at the time of density estimation is small and a case in which the scale is large.
Figure 3:
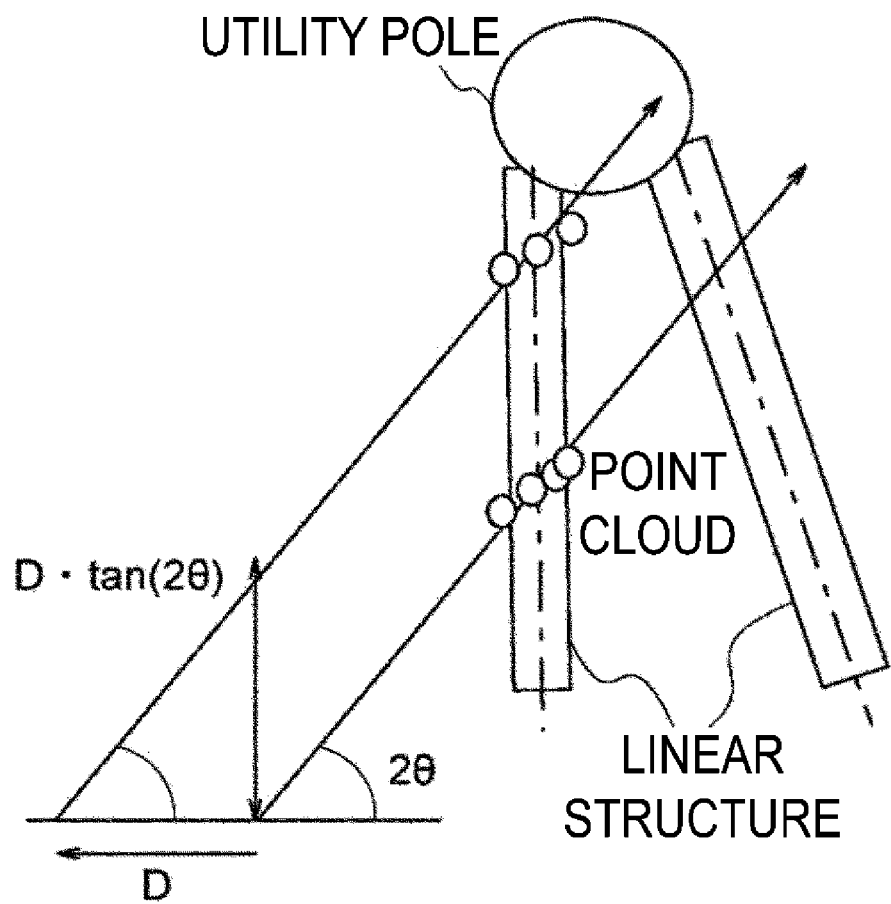
FIG. 3 is a diagram illustrating a scan line interval according to a relative posture with respect to a central axis of a linear structure.
Figure 4:
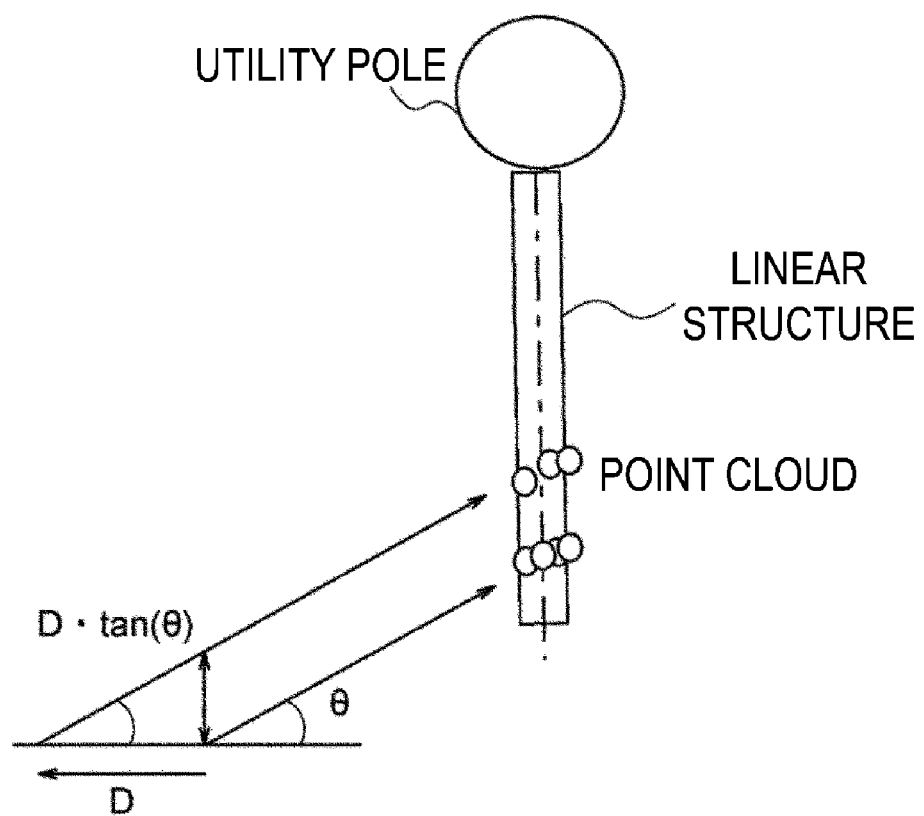
FIG. 4 is a diagram illustrating a scan line interval according to a relative posture with respect to a central axis of a linear structure.

Hereinafter, an example of a mode for carrying out the present invention will be described in detail with reference to the drawings.

Overview of Point Cloud Analysis Device According to Embodiment of Present Invention First, an overview of a point cloud analysis device according to an embodiment of the present invention will be described.

In the point cloud analysis device according to the embodiment, a measured point cloud is converted to a physical quantity called a length of a line segment of a linear structure and used when an evaluation score is calculated such that model estimation can be robustly performed on a change in density. Specifically, by projecting a point cloud in a direction along the central axis from a clustered point cloud shape, it is possible to obtain the length as an amount that is unlikely to depend on the number of points or density, and a quantization process is not required.

A linear structure such as a branch line or a cable has a certain length and has a property of being continuously present in a specific direction in a three-dimensional space. The point cloud data becomes discontinuous due to a property of laser measurement, but in the present invention, a direction in which the linear structure is continuous, that is, a central axis direction, is estimated, and a length of projection in the direction is used in the calculation of the evaluation score at the time of model estimation, such that susceptibility to the non-uniformity of the point cloud density is low, and parameters can be estimated accurately.

There are two schemes for obtaining the local effective length. One of the schemes (effective length estimation scheme A) is a scheme for directly estimating a scan line interval for only laser measurement data, and the other scheme (effective length estimation scheme B) is a scheme that can also be applied to a three-dimensional image from an infrared sensor or an ultrasonic sensor.

Further, because the linear structure has a small measured area, susceptibility of a nearby structure to the point cloud is high, but a direction (axial direction) of the effective length is taken into consideration as local geometric information when the evaluation score is calculated, making it possible to curb the influence of point clouds (outliers) on nearby structures that do not have the same direction as the axial direction. This is because for a point cloud on a plane on the structure, there is a low probability that a point cloud having a central axis direction in the same direction will be present on a certain line segment. Because it is easy for a central axis direction (extrusion direction) of each point cloud cluster to be estimated as a minimum curvature direction physically, the number of point clouds having an extrusion direction in a certain direction is large, for example, when the point clouds are on a cylinder, but there is a property that the minimum curvature direction is difficult to align in the certain direction on a plane.

Further, in the present embodiment, it is possible to prevent a false detection model from being estimated by considering information on a positional relationship of infrastructure facilities as information other than an input point cloud at the time of calculating the evaluation score. For example, a branch line is often wired for the purpose of eliminating an unbalanced load on a utility pole, that is, the branch line is likely to be wired in a direction opposite to a combined load direction of a cable, and it is essential for the branch line and the utility pole to be connected in order to transmit force. Further, the branch line is not likely to be grounded on a road surface on which the vehicle passes. When these requirements are not satisfied, it is possible to curb false model estimation by introducing an item with a penalty into the evaluation score at the time of model estimation.

Principle of Point Cloud Analysis Device According to Embodiment of Present Invention Next, a principle of the point cloud analysis device according to the embodiment of the present invention will be described.

First, definitions of the terms will be described.

In the present embodiment, modeling is defined as estimating a parametrically expressed three-dimensional shape when a three-dimensional point cloud or a three-dimensional image is received. For example, in the case of a utility pole, modeling means estimating physical quantities such as a radius, a length, a posture (tilt), and a taper size as a tapered cylindrical model from input data. In a linear structure such as a cable or a branch line, when a center line is approximated as a polynomial (for example, a quadratic curve) model, a coordinate system of a plane on which the curve is present, a coefficient of the curve, a position of an endpoint, a thickness, and the like are estimated as model parameters.

In a broad sense, information other than a model shape (geometric information) such as the number of point clouds on the model surface, the distance from the measurement position, and a ground height may be considered as a kind of parameter, but this is called model information in the present embodiment. Geometric information (information that defines a shape) obtained through model parameter estimation in RANSAC is distinguished from the model information.

Usually, a measured value always contains an error. In RANSAC estimation, a threshold value of an error range is set, data in which the distance from the model surface is within this threshold value is called an inlier, and clearly incorrect data is called an outlier. Further, because outliers are present and affect fitting from measurement results, a method of performing estimation while eliminating the influence of outliers is called robust estimation.

RANSAC is a solution obtained through numerical calculation, whereas there is also a scheme for estimating a model parameter analytically. For example, a least means square (LMS) is known as a method of minimizing a square error. This least means square is not robust to outliers.

On the other hand, RANSAC is a scheme for randomly extracting some samples (point clouds), evaluating a model parameter from the extracted samples, and repeating a process of evaluating an estimated model using remaining point clouds. When the extracted sample does not contain outliers, a more probable estimation is obtained, and when the number of outliers is smaller than a total number of measurements, more measurement values are contained within the estimated error range. Thus, estimation when the most measured values are contained in the range is regarded as correct estimation.

In the present embodiment, the point cloud on the same scan line is defined as a point cloud that is measured when a measurement surface (for example, a mirror that reflects a laser) is rotated once at the time of laser measurement. In the case of an MMS sensor, a laser sensor is fixed, and a surface shape of a measurement target object is recorded as a 3D point cloud on a stack as the vehicle moves. On the other hand, in the case of a fixed laser sensor, the sensor itself rotates so that data stacked by rotating the point cloud subjected to cross-section measurement with respect to a certain axis is often acquired. For example, when a scan rate is 100 Hz, 100 rotations of scanning are performed per second, and a point cloud layer for 100 measurements is recorded with a fixed laser. In the case of MMS, because the point cloud data is stacked in a spiral shape, two points within one rotation (within 0.01 seconds when the scan rate is 100 Hz) as defined above are determined to be points on the same scan line.

Further, "scan line interval" is a term that is used to distinguish and explain a point cloud for each scan line. In the case of MMS measurement, because the measurement is generally performed outdoors, large gaps occur in the point cloud in the sky part, and thus it is easy to distinguish between scan lines. Strictly speaking, measurement is performed for a continuous point cloud without interruption in a structure such as a tunnel, and it is difficult to distinguish whether the scan line is same. In the present embodiment, a certain point cloud and another point cloud are defined as point clouds on the same scan line for convenience when the point clouds are within the scan rate (hertz number). That is, when a difference between measurement times of the two point clouds is equal to or smaller than 0.01 seconds in the case of a scan rate of 100 Hz, a determination is made that the point clouds are on the same scan line. In this case, the determination is made using a smallest difference among differences in the measurement time between the two point clouds.

Further, the model information is information such as parameters (geometric information) of a 3D model, parameters used in a model estimation algorithm (for example, RANSAC), and a point cloud used in input. In the present embodiment, a model representing a cable, a service line, and a branch line (hereinafter referred to as a linear structure), which is an infrastructure facility, is a model in which a central axis of the linear structure is parametrically represented. This may be an Nth-order polynomial, a spline curve, or a group of piecewise continuous straight lines present in a three-dimensional space. It is assumed that a start point and an endpoint can be defined for the central axis, and physical values such as a length and a ground height can be obtained using only one parameter according to a distance from the endpoint.

Further, in the present embodiment, a case in which the linear structure that is an estimation target is a branch line of a utility pole will be described as an example.

The three dimensions may be latitude, longitude, and altitude (height) information or may be a three-dimensional Euclidean coordinate system or a polar coordinate system with a specific position set by a user as an origin. In the following example, a three-dimensional Euclidean coordinate system (respective directions are referred to as X, Y, and Z coordinates) at the origin set by the user is assumed. A unit of each coordinate is expressed in meters (m), centimeters (cm), and millimeters (mm), but other units may be used. The three-dimensional point is a point at which a photographing time of the point cloud, reflection intensity of the laser, color information such as red, blue, and green, or the like is imparted to the three-dimensional coordinates at each point. Information imparted to the three-dimensional point is not limited, but at least position information (X, Y, and Z coordinates) is imparted, and the three-dimensional point cloud is a set of two or more three-dimensional points.

A characteristic of the present invention is conversion to a "length" that is unlikely to fluctuate in the measurement condition. Specifically, each "point cloud cluster" can be converted to "length on the central axis" from "scanline interval" and "central axis direction". Further, because the effective length in a direction in which the linear structure is present is estimated, the direction and length are output.

First Embodiment

Configuration of Point Cloud Analysis Device According to First Embodiment

Figure 5:
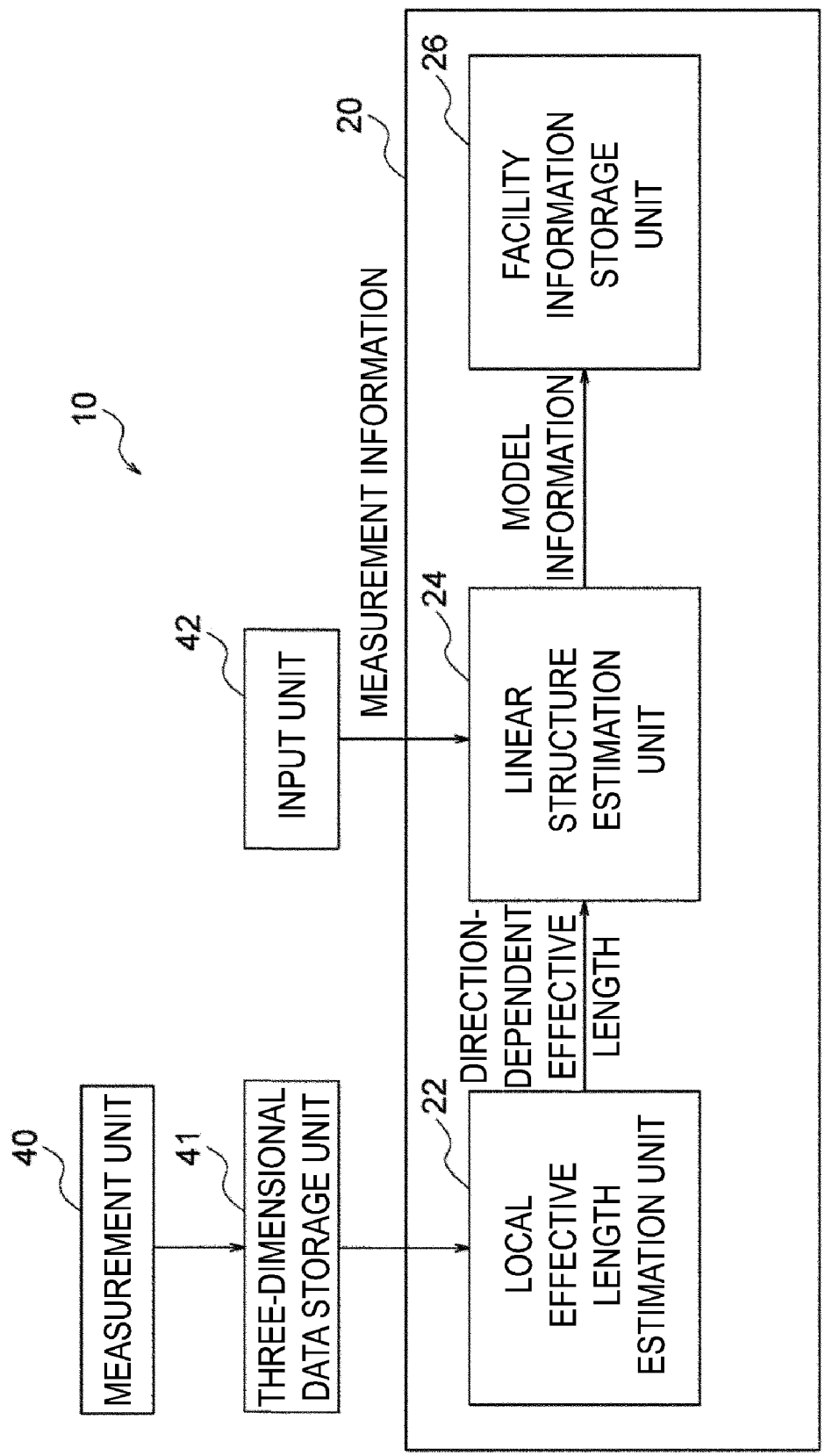
FIG. 5 is a block diagram illustrating an example of a functional configuration of the point cloud analysis device according to a first embodiment.

FIG. 5 is a block diagram illustrating an example of a functional configuration of the point cloud analysis device 10 according to the first embodiment.

As illustrated in FIG. 5, a point cloud analysis device 10 includes a calculation unit 20, a measurement unit 40, a three-dimensional data storage unit 41, and an input unit 42.

The three-dimensional data storage unit 41 is a device that stores a three-dimensional point cloud measured by a laser sensor or the like, three-dimensional point cloud data artificially generated by simulation or the like, and the like. As the laser sensor, either a fixed sensor or a mobile sensor is assumed. In the embodiment, although a case in which the measurement unit 40 is connected as an input of the three-dimensional data storage unit 41 will be described as an example, but the measurement unit 40 may be omitted.

The measurement unit 40 is a unit that is mounted on a moving body and measures a cloud of points representing three-dimensional points on an object while scanning a measurement position, such as a device that can measure a distance between a subject and a sensor, such as a laser range finder, an infrared sensor, or an ultrasonic sensor. For example, the measurement unit is a system in which a laser range finder is mounted in a car equipped with a GPS or in an airplane equipped with a GPS, and measurement is performed while the vehicle or the airplane is moving, thereby measuring a three-dimensional position of a surface of a subject that is a feature in an outdoor environment such as a cable, a building, a guardrail, or a road ground.

The input unit 42 is a user interface such as a mouse or a keyboard, and receives measurement information that is used in the point cloud analysis device 10 as an input. The measurement information is, for example, a utility pole position and a cable position obtained in advance. Further, the input unit 42 may be an external storage medium such as a universal serial bus (USB) memory in which measurement information is stored.

The calculation unit 20 includes a local effective length estimation unit 22, a linear structure estimation unit 24, and a facility information storage unit 26.

Here, a principle of estimation of the local effective length in the local effective length estimation unit 22 will be described.

Figure 6A:
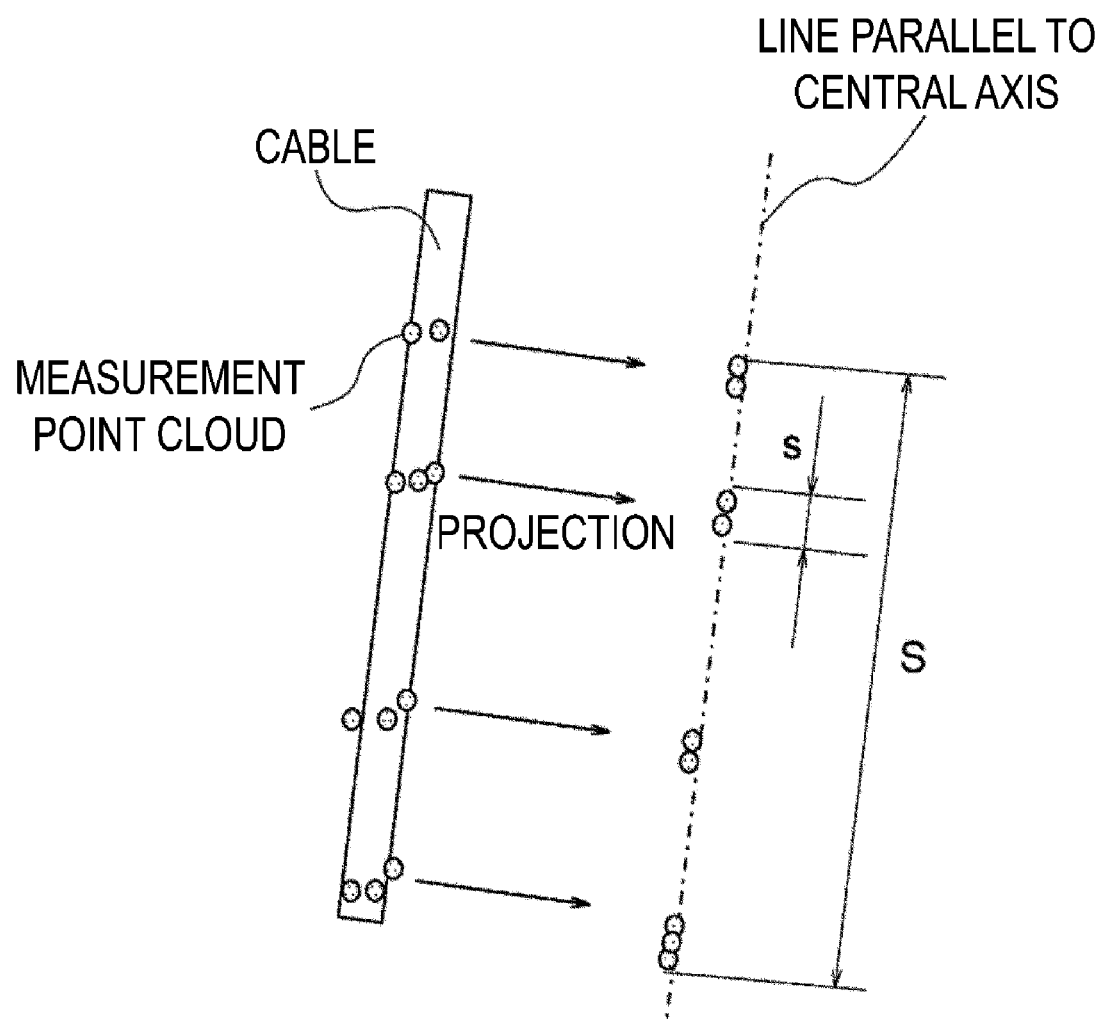
FIG. 6A is a diagram illustrating that a line segment width after projection in a central axis direction is the same regardless of a point cloud density within the same scan line.
Figure 6B:
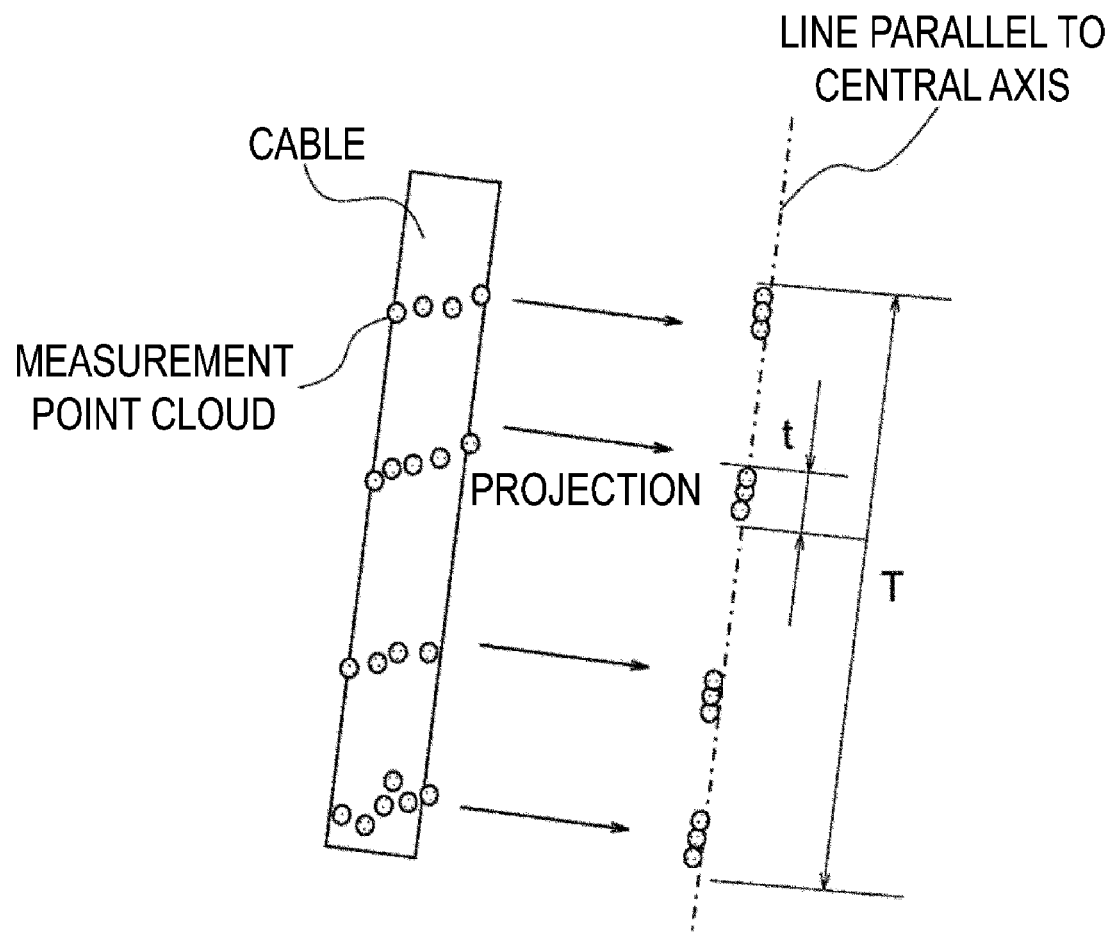
FIG. 6B is a diagram illustrating that a line segment width after projection in a central axis direction is the same regardless of a point cloud density within the same scan line.

First, as a property of the point cloud of the linear structure subjected to the laser measurement, when grouping is performed so that loss regions are connected, it is easy for a range of a region (a length of a line segment) when the point cloud on the linear structure is projected in the central axis direction of the linear structure regardless of a thickness of the linear structure to be the same value. For example, it is easier for a cable having a radius of 0.1 cm to measure as compared with a cable having a radius of 0.01 cm, and a measurement target region is wider (the number of point clouds is larger), but in a case in which a process of decreasing the radius to 0 as much as possible as illustrated in an example of a cable having a small radius in FIG. 6A and an example of a cable having a large radius in FIG. 6B, it is easy for a length along the central axis of the projected point cloud region to be equal even when there is a difference in the density or number of points of the point cloud on the measurement target surface (see S in FIG. 6A and T in FIG. 6B). That is, a line segment length when the point cloud is projected in the central axis direction is considered to be an amount that is not easily affected by a measurement condition, that is, a change in point density depending on the relative position between the measurement position and the linear structure, point cloud missing due to occlusion, or the like. Thus, conversion from a shape of the point cloud to a length along a central axis thereof is performed such that an effect of estimation of the model with high accuracy can be expected. That is, it is important to be able to estimate a length (a projection region) of projection of the point cloud onto the central axis, including a size of a loss region (a length on the central axis). When a scanning direction of the laser and the central axis direction are perpendicular to each other, it is easy for even lengths of projection of the point clouds in the same scan line (corresponding to s in FIG. 6A and t in FIG. 6B) to be equal.

The present invention is characterized by assuming it difficult to accurately determine a shape of the entire linear structure, and estimating a projection length of a point or a point cloud cluster of interest in consideration of the influence of the loss region locally.

Figure 7:
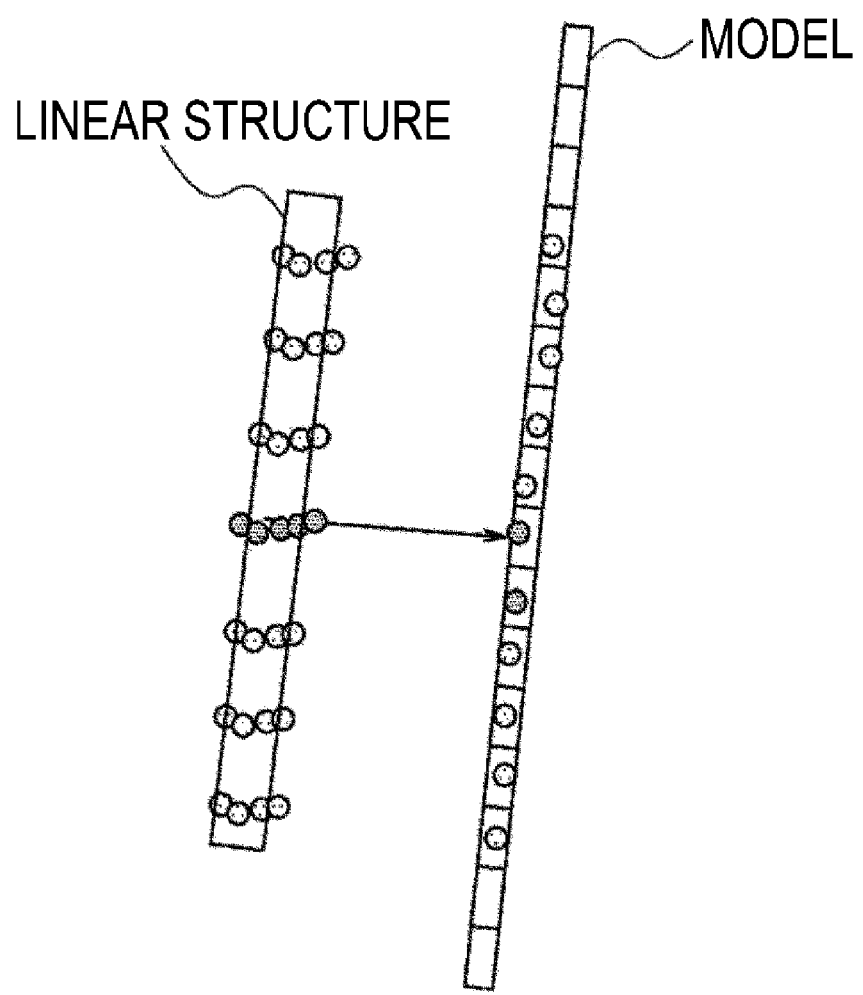
FIG. 7 is a diagram illustrating a case in which a linear structure can be measured without any loss.

Further, although factors that cause poor measurement conditions have been described, a definition of a case in which the measurement condition is good in the present embodiment is a situation in which the point cloud can be measured without any loss with respect to the linear structure, that is, a situation in which there is no gap on the central axis of the linear structure and the density is uniformly measured (FIG. 7).

Effective Length Estimation Scheme A

An estimation method based on measurement time information will be described as effective length estimation. This is an effective method when the measurement time is recorded in all the measurement point clouds as in MMS.

Figure 8:
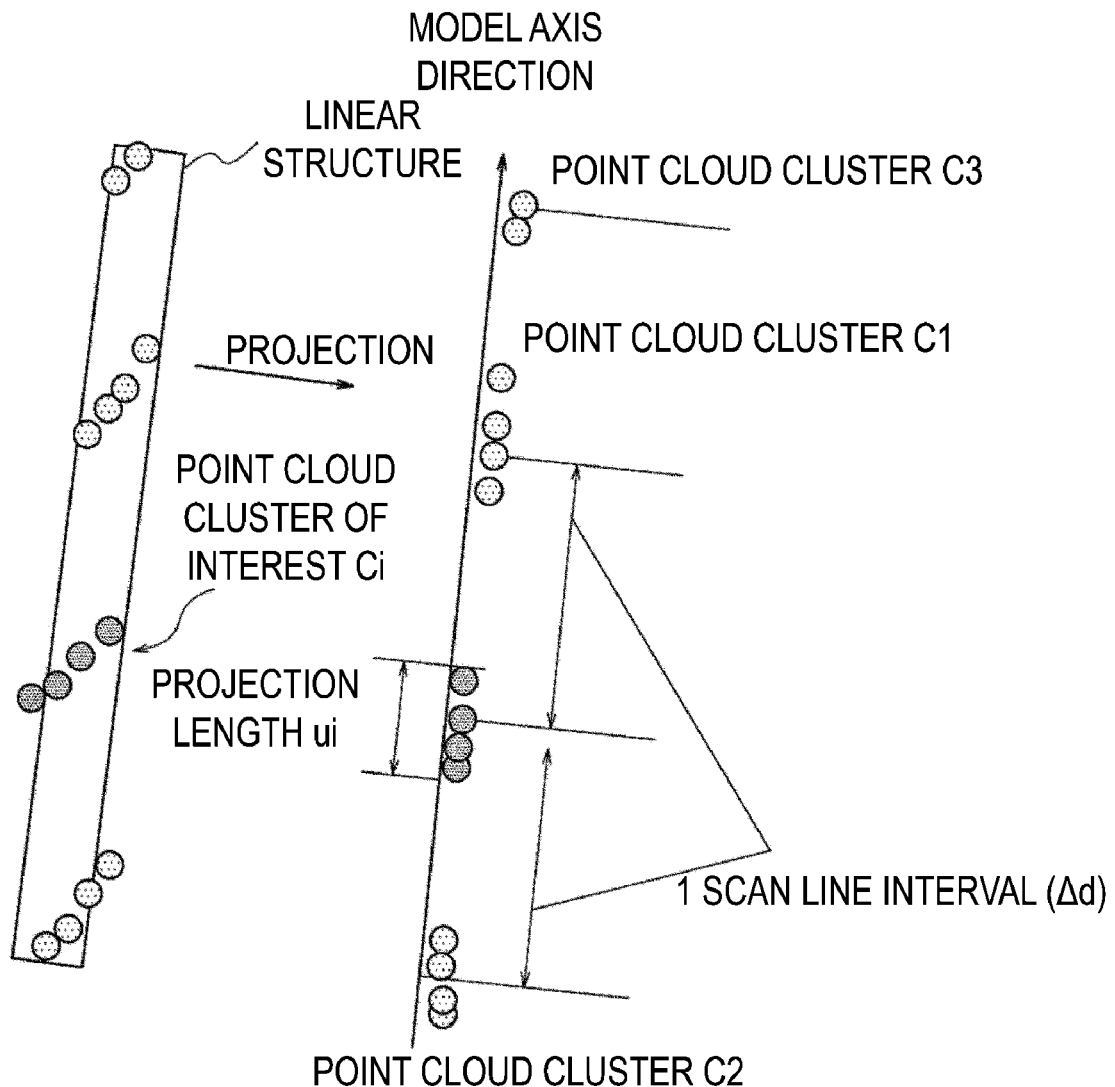
FIG. 8 is a diagram illustrating a method of estimating a local effective length.

As illustrated in FIG. 8, the local effective length estimation unit 22 estimates a distance $u_i$ of projection of the point cloud cluster onto the central axis, and then increases the projection distance $u_i$ by an amount of the loss region to perform interpolation from a scan line interval $\Delta d$ and the projection distance $u_i$. That is, not only the point cloud is converted to the length along the central axis, but also the projection region is corrected for the loss region caused by the measurement condition.

First, point cloud clustering within the same scan line will be described. Hereinafter, a symbol for distinguishment of an input point cloud is referred to as i, and a symbol for distinguishing between the point of interest and nearby points is referred to as j.

The following processes 1) and 2) are repeated for each three-dimensional point, so that point cloud clustering within the same scan line is performed.

1) kp nearby point clouds are detected for a three-dimensional point pi of interest.

2) When a difference in measurement time between the point of interest pi and the nearby point pj in the kp nearby point cloud is a time within one scan, a determination is made that the point of interest pi and the nearby point pj are in the same cluster.

Here, the number of nearby points kp is a parameter determined experimentally, and is set to 4 as an example. Physically, it is only required that kp=2 because it is necessary to compare the point of interest with points before and after scanning, but a number larger than 2 is preferable because noise such as dust in the air may be measured.

Further, the time within one scan is determined to be the same cluster when the measurement time with the nearby point is 1/50=0.02 [second], for example, under the measurement condition of the scan rate of 50 Hz. Through this process, a point cloud of the same scan line becomes one cluster, as illustrated in FIG. 8. In an example of the present embodiment, the scan rate was set to 100 [Hz].

In the embodiment of the present invention, in each point cloud cluster, the effective length for compensating for loss regions of the point cloud cluster and a point cloud cluster of an object on the same subject is estimated. That is, it is an undesired estimation result to interpolate between each point cloud cluster and a point cloud cluster that is not the same cluster. As a preventive measure for this, conversion to local effective length is performed using a nearby point cloud cluster having a similar extrusion direction, which is a tangential direction in a central axis direction of a certain point cloud cluster, in consideration of the fact that the central axis (direction) is the same when linear structures are the same. Thus, the nearby point cloud clusters without similar extrusion directions are not used at the time of estimating the effective length.

Specifically, for a certain point cloud cluster of interest, a point cloud cluster j within a radius R [m] is determined to be a nearby point cloud cluster in the same direction when a degree of similarity in the central axis direction is equal to or greater than a threshold TH_angle. The degree of similarity is obtained by calculating an absolute value of an inner product value of the point cloud clusters in the central axis direction (three-dimensional vector).

Here, the radius R [m] and the threshold value TH_angle are parameters determined experimentally, and in one example of the embodiment, R=1.0 [m] and TH_angle=0.8.

In principle, the scanline interval can be estimated based on time information and a distance of the point cloud cluster. For the nearby point cloud clusters having similar central axis directions, a distance $\Delta d$ of one scan line interval is estimated from an inter-centroid distance between the nearby point cloud cluster and a centroid position of the point cloud cluster of interest. Whether or not a cluster is a nearby point cloud cluster of a certain point cloud cluster of interest is determined according to whether or not the distance is within R [m] as described above.

Further, the number of scan line intervals T is calculated from a difference $\Delta t_{i,j}$ between an average value of a time of the point cloud cluster of interest and an average value of a time of the surrounding point cloud cluster, and the scan rate. Further, an axial central axis direction at a position of the point cloud cluster of interest can be calculated as the extrusion direction (corresponding to the tangential direction), and for a method of calculating the extrusion direction, a scheme described in Patent Literature 2 may be used, for example.

[Patent Literature 2] JP 2019-3527A

Using a certain point cloud cluster of interest i and a nearby point cloud cluster j, the number T of scan line intervals can be obtained by the following equation with scan rate=Hr [Hz].

$$T=\text{round}(\Delta t_{i,j} \cdot Hr) \qquad [\text{Math. 1}]$$

Here, a function round is a function of rounding off a first decimal place of an input real number and outputting a resultant value as an integer value, and $\Delta t_{i,j}$ means an absolute value of a difference value between measurement times of the point cloud cluster i and the point cloud cluster j.

In this case, using a certain point cloud cluster of interest i and a certain nearby point cloud cluster j, one scan line interval in the point cloud cluster i can be obtained by the following equation.

[Math. 2]

$$\Delta d_{i,j} = \Sigma D(C_i, C_j)/T \qquad (1)$$

Here, $C_i$ and $C_j$ denote a centroid position of the i-th adjacent point cloud cluster and a centroid position of the j-th point cloud cluster among the point cloud clusters near T, and D denotes the distance. That is, the above equation represents an average of the distances between the centroid position of the i-th adjacent point cloud cluster and the centroid position of the j-th point cloud cluster among the point cloud clusters near T.

In order to alleviate an estimation error, the interval $\Delta d_i$ of one scan line in the certain point cloud cluster of interest i is obtained by calculating an average value thereof using $k_c$ nearby point number clusters.

$$\Delta d_i = \frac{1}{k_c} \sum_{j=1}^{k_c} \Delta d_{i,j} \qquad [\text{Math. 3}]$$

A local effective length $w_i$ in the i-th point cloud cluster Ci and a local effective length $wi^p$ at a point $i^p$ when a point belonging to the i-th point cloud cluster is expressed as $i^p$ are obtained using the following equation.

$$w_i = \min(\Delta d_i, u_i \cdot \zeta_{cluster}) \qquad [\text{Math. 4}]$$

$$w_i^p = \min(\Delta d_i, u_i \cdot \zeta_{cluster})/\text{Num}(C_j) \qquad (2)$$

Here, $u_i$ indicates a projection distance that is a length when a point cloud included in the point cloud cluster of interest is projected in the central axis direction. $\zeta_{cluster}$ is a correction limit value that is an upper limit value of how many times the projection distance may be corrected, and is a predetermined value. For example, $\zeta_{cluster}$ is 10.0. When the point cloud cluster consists of only one point, the projection distance $u_i$ is set to a predetermined value (for example, 0.01). Num ($C_i$) represents the number of points included in the point cloud cluster $C_i$.

This local effective length physically means a length of projection of the scan line interval in the central axis direction. An upper limit value $\zeta_{cluster}$ is an upper limit for correction of observed data (measurement point cloud), and has an effect of curbing of an influence on post-processing due to erroneous correction. That is, this is set for confirmation whether a corrected effective length is remarkably larger than a projection length and curbing of an adverse effect of a correction error.

An effective length in the certain point cloud cluster of interest and a direction of the effective length, that is, a central axis direction (extrusion direction) are used in the model estimation.

Figure 9:
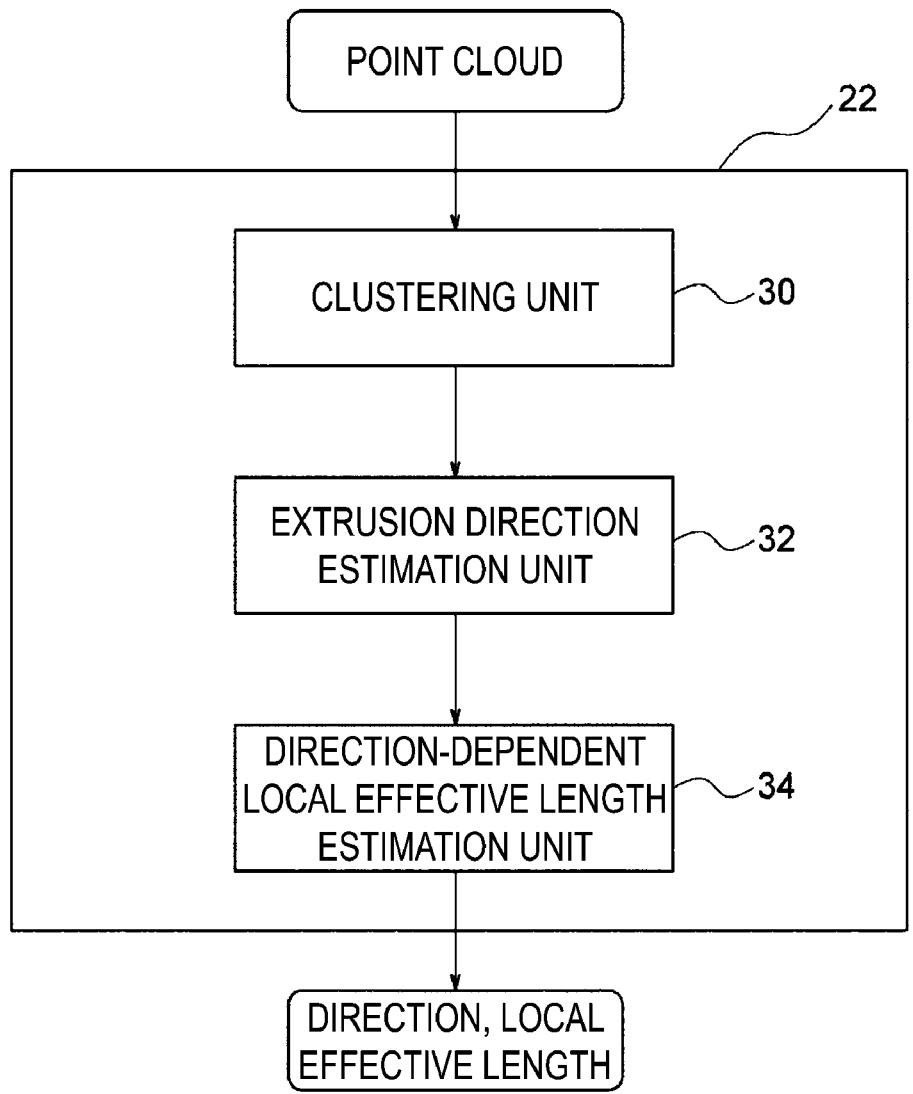
FIG. 9 is a block diagram illustrating an example of a configuration of a local effective length estimation unit of the point cloud analysis device according to the first embodiment.

According to the principle described above, the local effective length estimation unit 22 includes a clustering unit 30, a central axis direction estimation unit 32, and a direction-dependent local effective length estimation unit 34, as illustrated in FIG. 9.

The clustering unit 30 clusters the point cloud in the scan line among the point clouds input from the three-dimensional data storage unit 41 to obtain the point cloud cluster.

The central axis direction estimation unit 32 estimates the central axis direction from each point cloud cluster using a point cloud within a certain radius.

The direction-dependent local effective length estimation unit 34 estimates a local effective length that is a length when the length of projection of the point cloud cluster in the central axis direction for each of the point cloud clusters is interpolated by an amount of the loss part of the point cloud based on the estimated central axis direction and the interval of the scan lines formed by the point cloud.

Effective Length Estimation Scheme B

A method of calculating the local effective length and the estimation of the central axis direction are not limited to the above method, and other methods may be used. For example, as in Patent Literature 1, clustering may first be performed on the point cloud, then a straight line (or curve approximation) may be performed on each point cloud cluster, and a direction of the straight line (or the curve) may be set as a central axis, and the effective length may be obtained from a length when a point cloud belonging to each point could cluster is projected on the central axis.

A point cloud cluster subjected to straight line approximation will be described as a specific example. First, the length between two points most distant in a direction along the central axis obtained by principal component analysis is obtained.

Next, the length divided by the number of points included in the point cloud cluster is the effective length of each point, and a first eigenvalue vector subjected to the principal component analysis corresponds to the central axis direction.

A point cloud cluster subjected to quadratic curve approximation (arc approximation) will be described as a specific example. First, circle fitting is performed on the point cloud cluster through RANSAC so that a central axis of an arc is obtained. Next, two most distant points are selected with reference to a length along the central axis, and the length along the central axis is defined as a length of the point cloud cluster. Finally, the length divided by the number of points included in the point cloud cluster is an effective length of each point, and the central axis direction corresponds to a tangential direction of the curve at a position of each point.

Effective length estimation scheme B is effective in a point cloud with no measurement time information. For example, this is a point cloud (three-dimensional image) measured by a device such as an infrared sensor, for example, Kinect (registered trademark) of Microsoft Corporation. Further, in order to reduce an amount of data stored in the measured point cloud, the scheme can be applied to, for example, three-dimensional data from which time information has been deleted, unlike effective length estimation scheme A.

Figure 10A:
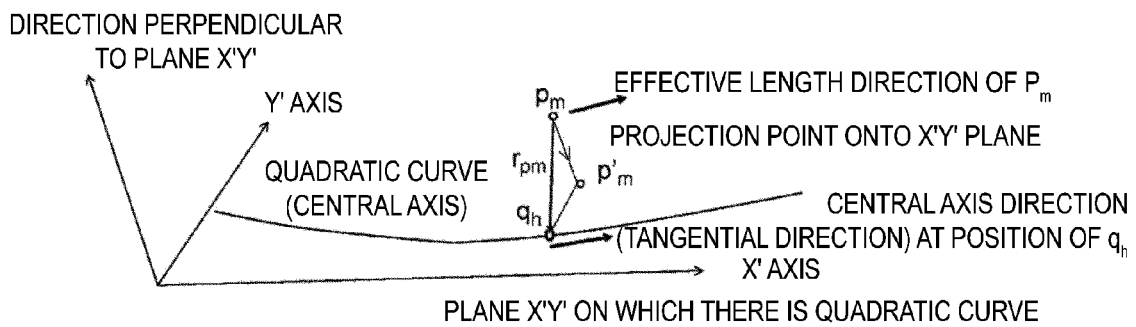
FIG. 10A is a conceptual diagram of a distance between a three-dimensional point and a quadratic curve present in a three-dimensional space.

For the model parameter estimation in the three-dimensional space, a method described in Patent Literature 1, for example, may be used. In the case of a linear structure, model fitting with the thickness set to 0 for convenience, that is, model fitting based on a distance between the central axis and the three-dimensional point cloud is performed. When there is a model in which passage through an input point cloud at a distance of 0 occurs, that is, a model in which a distance error from the input point cloud is 0, calculation as a most probable model is performed. Further, the evaluation score is calculated using the effective length of the point cloud cluster and the central axis direction of the point cloud cluster. An image of the effective length direction and the model central axis direction (tangential direction) in each point cloud cluster (position pm) are illustrated in FIG. 10A. A specific method will be described below. Here, FIG. 10A is a conceptual diagram illustrating a distance between the three-dimensional point $p_m$ and the quadratic curve present in the three-dimensional space. $q_h$ denotes a position (perpendicular foot) of the shortest distance from $p_m$ to the quadratic curve. According to a three-square theorem, a distance $r_{pm}$ between a point of interest pm and a foot $q_h$ of a perpendicular line from the point of interest to the central axis can be calculated using a line segment $p_m p'_m$ and a line segment $p'_m q_h$. Here, the point $p'_m$ is a point at which the point of interest is projected onto a plane on which the quadratic curve rests.

The linear structure estimation unit 24 estimates a model parameter of the linear structure represented by the point cloud cluster using RANSAC based on the local effective length estimated for each of the point cloud clusters, the estimated central axis direction, and the measurement information.

Specifically, the linear structure estimation unit 24 estimates the model parameter of the linear structure represented by the point could cluster so that a value of an evaluation function for evaluating the model parameter, including a penalty term based on a positional relationship with the surrounding structure obtained in advance, is maximized.

Here, in the case of an evaluation function using the point cloud cluster, an evaluation function J is expressed by the following equation.

[Math. 5]

$$J(Q;M)=\Sigma_{i=1}^{N_q}(w_i \cdot \cos(\theta_i) \cdot \zeta(q_i))+\alpha \cdot E(M) \qquad (3)$$

Figure 10B:
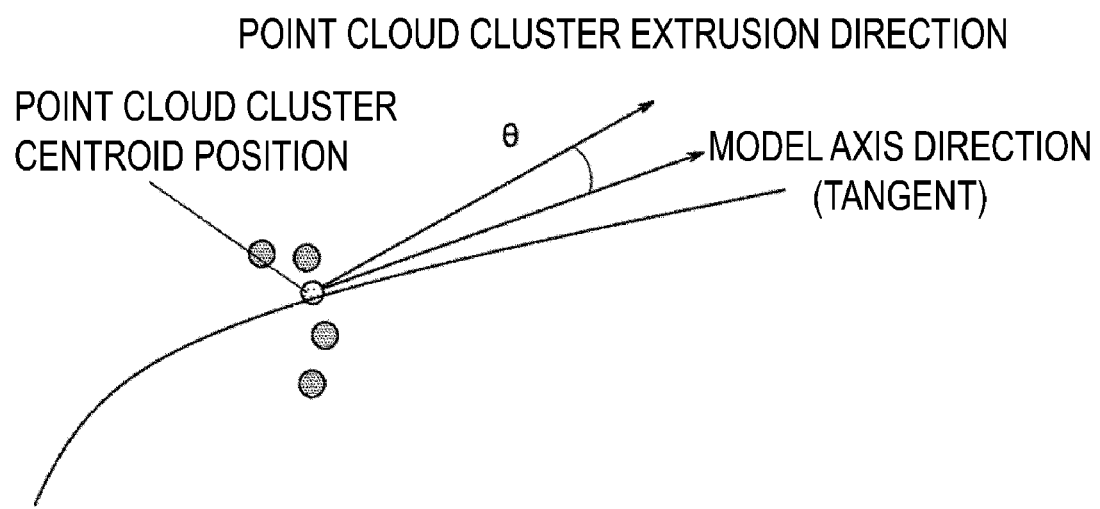
FIG. 10B is a diagram illustrating an angle formed by a central axis direction and a central axis of a model.

Here, M is a model that is an evaluation target, Q is a set of point cloud clusters, $q_i$ is a centroid position of the i-th point cloud cluster, and $N_q$ is a total number of point cloud clusters. Further, $w_i$ is a local effective length of the i-th point cloud cluster, and θi is an angle that is formed by the central axis direction estimated for the i-th point cloud cluster $q_i$ and the central axis of the model M (a tangential direction of the central axis at the position of $q_i$) (FIG. 10B).

$\zeta(q_i)$ is a function that outputs 1 when a distance between the point $q_i$ and the model M is equal to or smaller than a threshold value ε, and otherwise outputs 0. Further, E (M) becomes a predetermined negative value when any of the following conditions (1) to (3) is satisfied. For example, a value of negative infinity may be set so that a model when a penalty occurs is not used as the estimation result. Further, when the value of negative infinity is set, α may be deleted or set to 1. Further, a penalty term E may not be set to negative infinity, and an appropriate negative value may be input to α so that α·E(M) outputs a negative value. That is, α·E(M) may be designed to work as a penalty.

Condition (1): The utility pole and the model of the linear structure do not intersect. Specifically, a determination may be made that intersection does not occur when a shortest distance between an extension line (tangent line) of an endpoint of a branch line model and a central axis of the utility pole is equal to or greater than the threshold value TH_Dpole. Here, the distance threshold value TH_Dpole is a parameter determined experimentally, and is set to 0.3 [m] in an example of the present embodiment.

Figure 11:
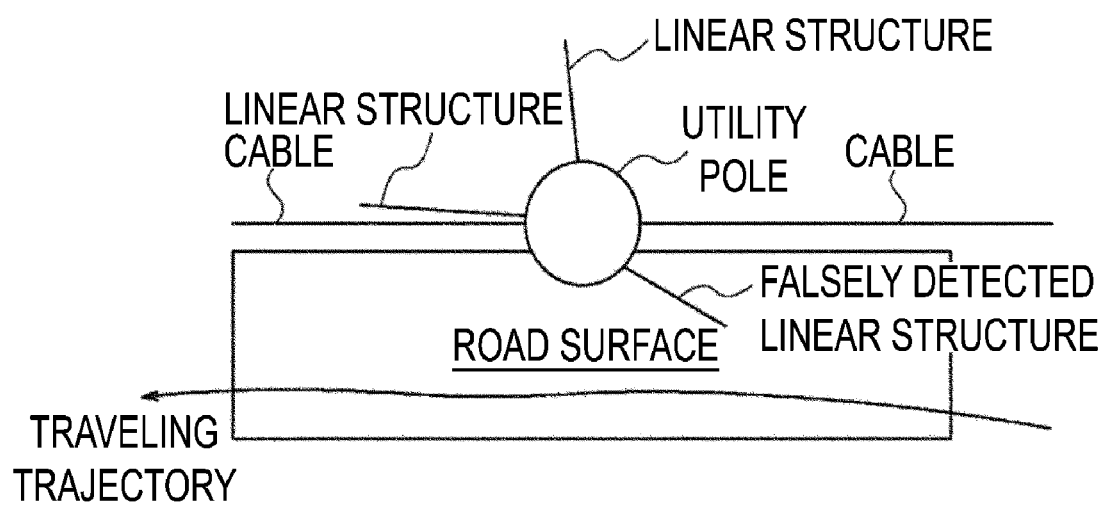
FIG. 11 is an image diagram of a case in which a model of the linear structure is present on a road.

Condition (2): An intersection position between the model of the linear structure and the ground is on the road side (MMS traveling trajectory side) relative to the cable (FIG. 11). As a specific method, for example, automatic estimation as a point cloud on the inner side in which a white line is detected is performed on a vehicle traveling lane, or the point cloud is manually labeled. When at least one label of a point cloud present within a distance r_ground from an installation (ground) position of the branch line model is the vehicle traveling lane, a determination is made that the condition is satisfied.

In the present embodiment, an MMS traveling trajectory (X, Y, and Z coordinate group at which the MMS has traveled) is used as a simple method. Because it is certain that the MMS traveling trajectory is a lane in which the vehicle can travel, a shortest distance between the branch line model and the MMS traveling trajectory is calculated, and when the distance is within a threshold distance r_ground, a determination is made that a penalty will occur.

The threshold distance r_ground is a parameter determined experimentally, and is set to 0.3 [m] in an example of the present embodiment.

Figure 12:
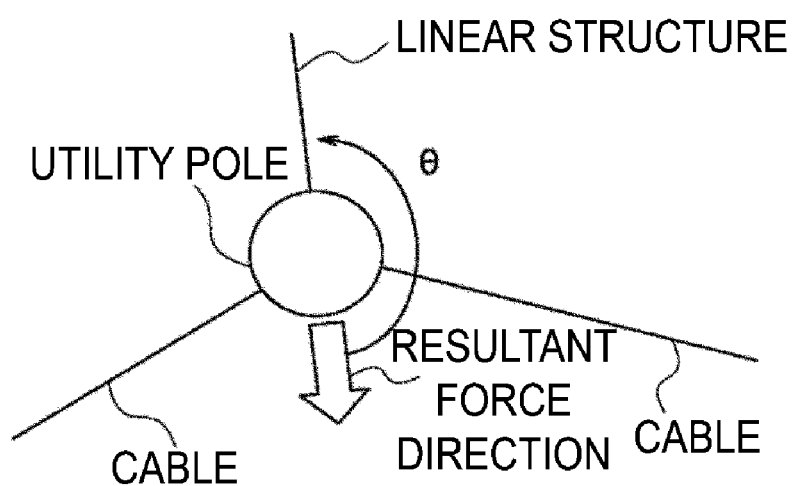
FIG. 12 is an image diagram of a case in which the model of the linear structure is present on the side opposite to a resultant force direction of a cable.

Condition (3): The model of the linear structure is on the same side as the resultant force direction of the cable with respect to the cable (FIG. 12).

Specifically, in the present embodiment, a resultant force direction may be used as an average vector of a direction (vector) when the cable model detected in advance is projected onto the ground (XY plane). For example, when a load W[N] per unit length of the cable is known, a horizontal tension obtained from looseness of the cable may be used as a magnitude of the force. An existing technology may be used as a method of calculating the horizontal tension and, for example, a cable point cloud is approximated as a catenary curve, and a horizontal tension T is obtained using a looseness d' obtained from the catenary curve, a distance S' between cable end points, and a density W per unit distance of the cable.

$$T \approx \frac{WS'^2}{8d'} \qquad \text{[Math. 6]}$$

Regarding condition (3), for example, when an angle formed by a line segment when the central axis of the model of the linear structure is projected onto the horizontal plane and a direction of resultant force when viewed from above is smaller than 90 degrees, a determination is made that condition (3) is satisfied.

Specifically, an angle formed by a resultant force direction (two-dimensional vector) and a direction (two-dimensional vector) of projection of a direction connecting branch endpoints onto the ground is obtained, and a penalty occurs when the angle is smaller than 90 degrees. Originally, it is considered that branch line tension is to be generated on the side opposite to tension resultant force, and it is preferable for a formed angle to be 180 degrees in an opposite direction as an original role of the branch line.

Further, in the case of an evaluation function using a point cloud, the evaluation function is expressed by the following equation.

[Math. 7]

$$J(P;M)=\Sigma_{i=1}^{N_p}(w_i^p \cdot \cos(\theta_i^p) \cdot \zeta_{(p_i)} + \alpha \cdot E(M) \qquad (4)$$

Here, M is a model that is an evaluation target, P is a point cloud set, Np is a total number of three-dimensional points included in the point cloud, and $p_i$ denotes a position of an i-th three-dimensional point. $w^p_i$ is a local effective length of the i-th point, and $\theta^p_i$ is an angle formed by the central axis direction of the point cloud cluster to which the i-th point belongs and the tangential direction of the central axis of the model.

$$\zeta_{(p_i)}$$

is a function that outputs 1 when a distance from the point $p_i$ to the model M is equal to or smaller than a threshold value ε, and otherwise outputs 0.

By estimating the model parameter of the linear structure so that the value of the evaluation function shown in Equation (3) or (4) above is maximized, it is possible to estimate the model parameter of the linear structure so that a weight with respect to the formed angle $\theta_i$ and a distance $$\zeta_{(p_i)}$$

from the model M is increased when the local effective length is greater and a positional relationship with the surrounding structure satisfies a constraint condition.

In the RANSAC by the linear structure estimation unit 24, linear structures are detected one by one from a model having the highest score, and a parameter of the model at that time is used as an estimation result of the parameter of the model. An estimation model parameter $$\tilde{M}$$

is calculated by the following equation.

$$\tilde{M} = \arg\max(\Sigma_{i=1}^{N}(w_i \cdot \cos(\theta_i) \cdot \zeta_{(q_i)} + \alpha \cdot E(M)) \qquad \text{[Math. 8]}$$

When the evaluation score of the detected model is equal to or lower than the threshold value, a determination is made that there is no model to be detected, and the process ends.

Figure 13:
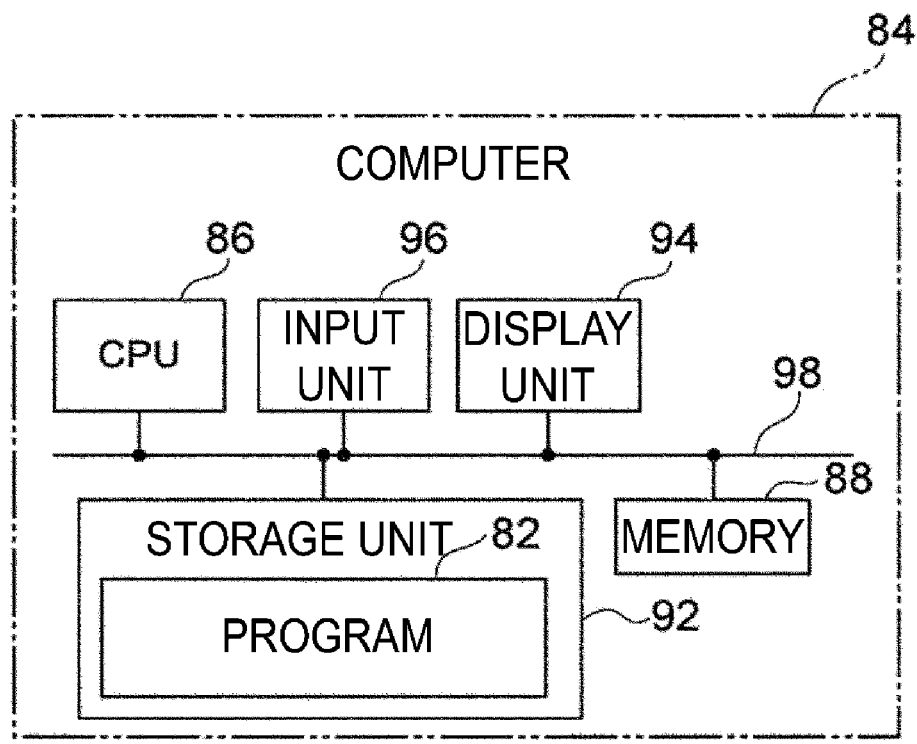
FIG. 13 is a schematic block diagram of an example of a computer that functions as a point cloud analysis device.

The point cloud analysis device 10 is realized by a computer 84 illustrated in FIG. 13 as an example. The computer 84 includes a CPU 86, a memory 88, a storage unit 92 that stores a program 82, a display unit 94 that includes a monitor, and an input unit 96 that includes a keyboard or a mouse. The CPU 86, the memory 88, the storage unit 92, the display unit 94, and the input unit 96 are connected to each other via a bus 98.

The storage unit 92 is realized by an HDD, an SSD, a flash memory, or the like. The program 82 for causing the computer 84 to function as the point cloud analysis device 10 is stored in the storage unit 92. The CPU 86 reads the program 82 from the storage unit 92, loads the program 82 into the memory 88, and executes the program 82. The program 82 may be stored in a computer-readable medium and provided.

Operation of Point Cloud Analysis Device According to First Embodiment

Figure 14:
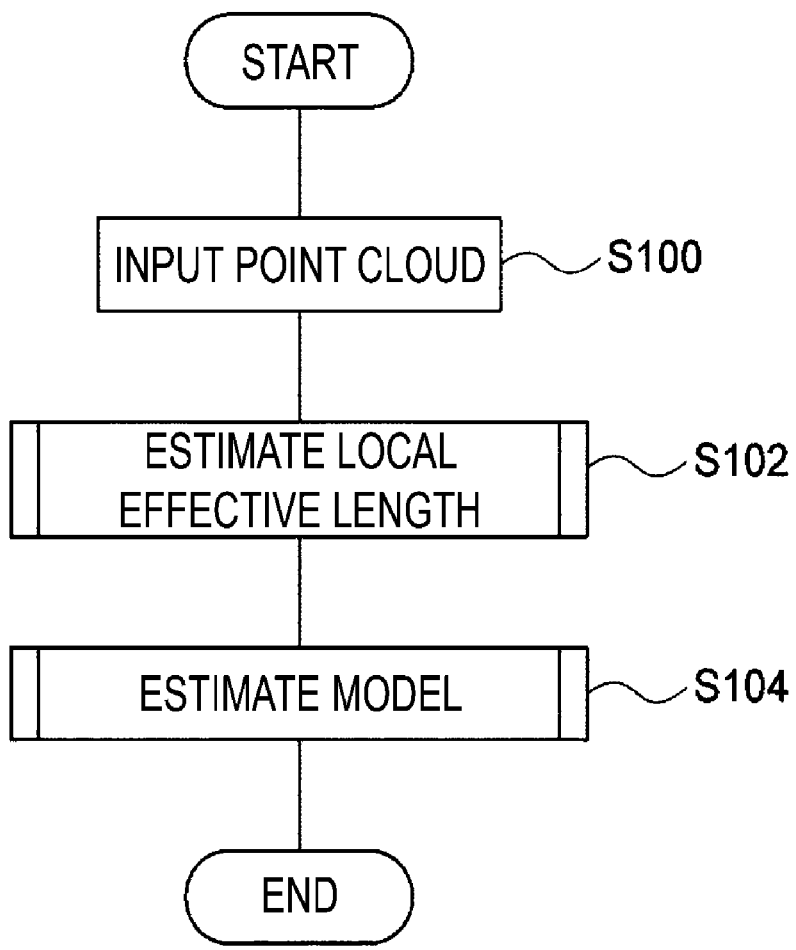
FIG. 14 is a flowchart illustrating an example of a flow of a process according to a program according to the first embodiment.

Next, an operation of the point cloud analysis device 10 according to the first embodiment will be described with reference to FIG. 14. FIG. 14 is a flowchart illustrating an example of a flow of a process according to the program 82 according to the first embodiment.

When the point cloud analysis device 10 according to the first embodiment is instructed to execute a point cloud analysis process through an operation of an operator, the CPU 86 reads out and executes the program 82 stored in the storage unit 92.

First, in step S100 of FIG. 14, the local effective length estimation unit 22 acquires a point cloud consisting of three-dimensional points from the three-dimensional data storage unit 41.

In step S102, the local effective length estimation unit 22 estimates the projection distance $u_i$ on each of the point cloud clusters obtained by clustering the point clouds in the central axis direction, and increase the projection distance $u_i$ by an amount of the loss region (line segment) of the point cloud to estimate the local effective length from the scan line interval and projection distance $u_i$.

In step S104, the linear structure estimation unit 24 uses the local effective length estimated for each of the point cloud clusters and the measurement information to estimate the model parameter of the linear structure represented by the point cloud cluster through RANSAC.

Figure 15:
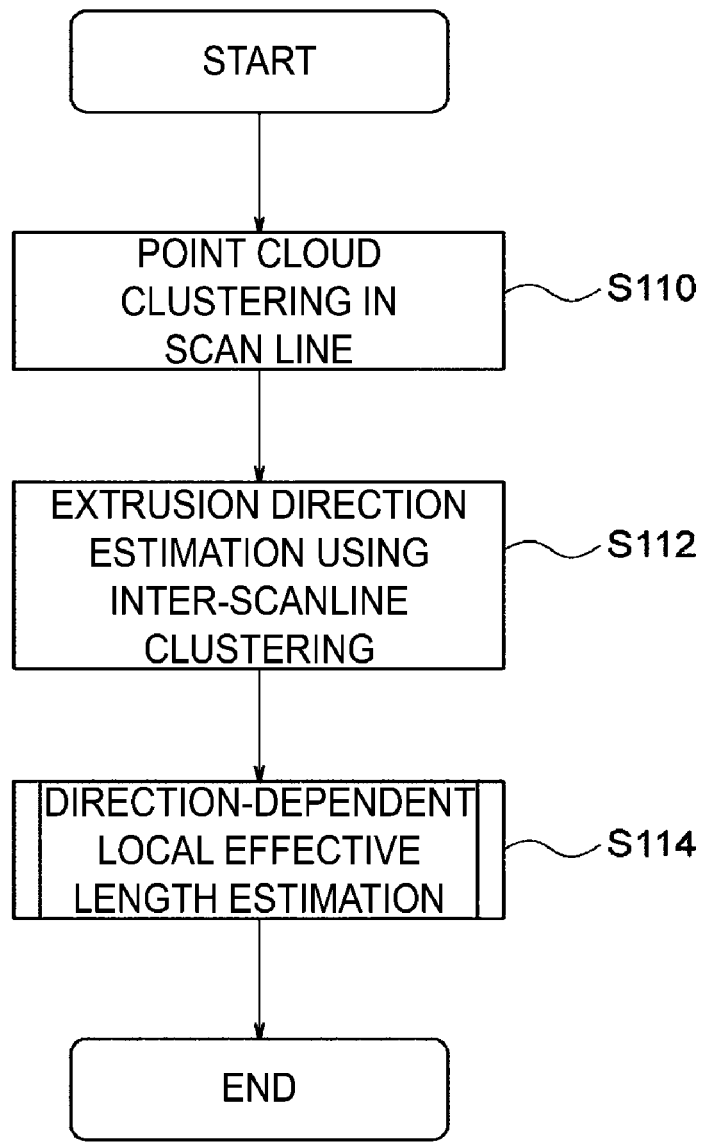
FIG. 15 is a flowchart illustrating an example of a flow of a process of estimating a local effective length according to the program according to the first embodiment.

A process of step S102 is realized through a process routine illustrated in FIG. 15.

First, in step S110, the clustering unit 30 performs point cloud clustering in the scan line based on the acquired point cloud.

In step S112, the central axis direction estimation unit 32 estimates the central axis direction for each point cloud cluster using the point cloud clusters between the scan lines. For example, a correlation value between the point cloud cluster of interest and the point cloud cluster around the point cloud cluster of interest is calculated for each of tentative central axis directions. Here, the correlation value between the point cloud cluster of interest and the point cloud cluster around the point cloud cluster of interest is calculated from a degree of similarity in a shape of the point cloud clusters. A tentative central axis direction in which the calculated correlation value is maximized is estimated as the central axis direction of the point cloud cluster of interest.

In step S114, the direction-dependent local effective length estimation unit 34 estimates the local effective length that is a length when the projection distance that is a length of projection of the point cloud cluster in the central axis direction is interpolated by an amount of the loss part of the point cloud based on the central axis direction estimated for the point cloud cluster and an interval between the scan lines formed by the point cloud, for each point cloud cluster.

Figure 16:
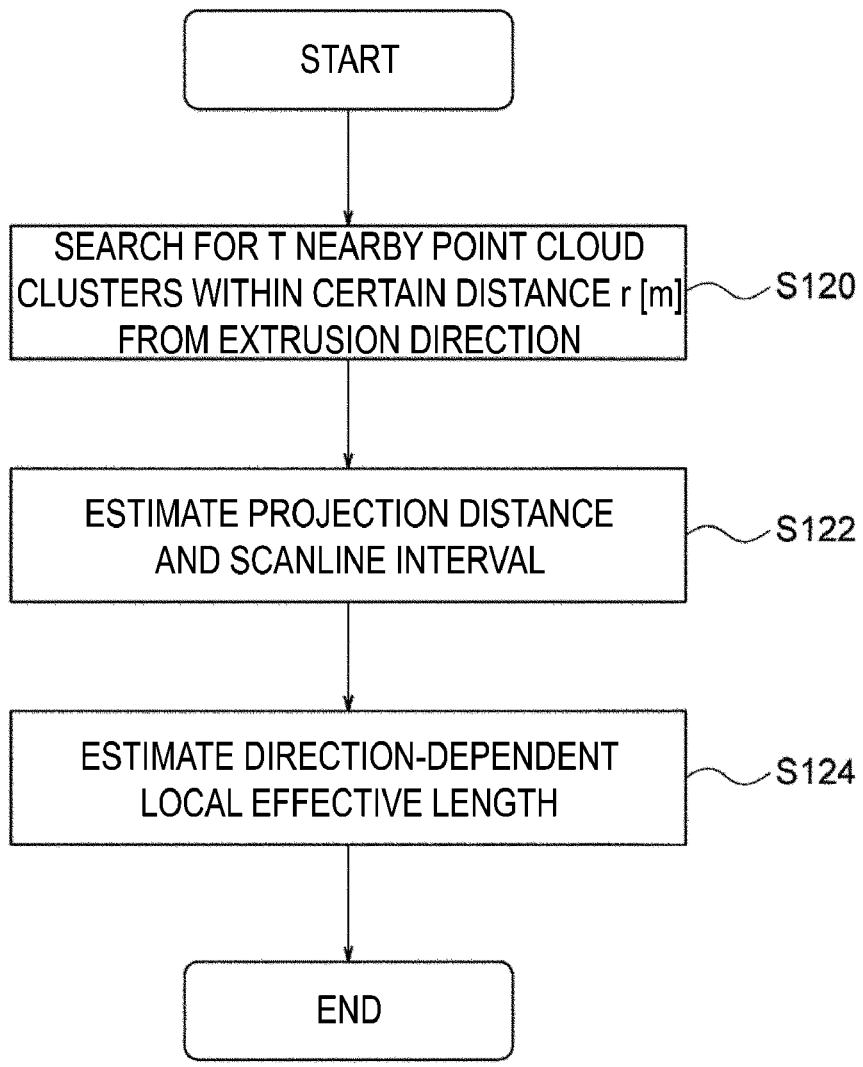
FIG. 16 is a flowchart illustrating an example of a flow of a process of estimating a local effective length according to the program according to the first embodiment.

A process of step S114 is realized by the process routine illustrated in FIG. 16. The process routine illustrated in FIG. 16 is repeatedly executed for each of the point cloud clusters of interest.

First, in step S120, a point cloud cluster having a distance of about T in the central axis direction from the point cloud cluster of interest among point cloud clusters present within a certain distance r [m] in the central axis direction with respect to the point cloud cluster of interest is searched for from the point cloud cluster obtained to be a result of clustering in step S102.

In step S122, the projection distance when the point cloud cluster of interest is projected in the central axis direction is estimated. Further, the scan line interval is estimated according to Equation (1) above based on the centroid position of each of the point cloud clusters searched for in step S120.

In step S124, the local effective length is estimated according to Equation (2) above using the projection distance and the scan line interval obtained in step S122.

Figure 17:
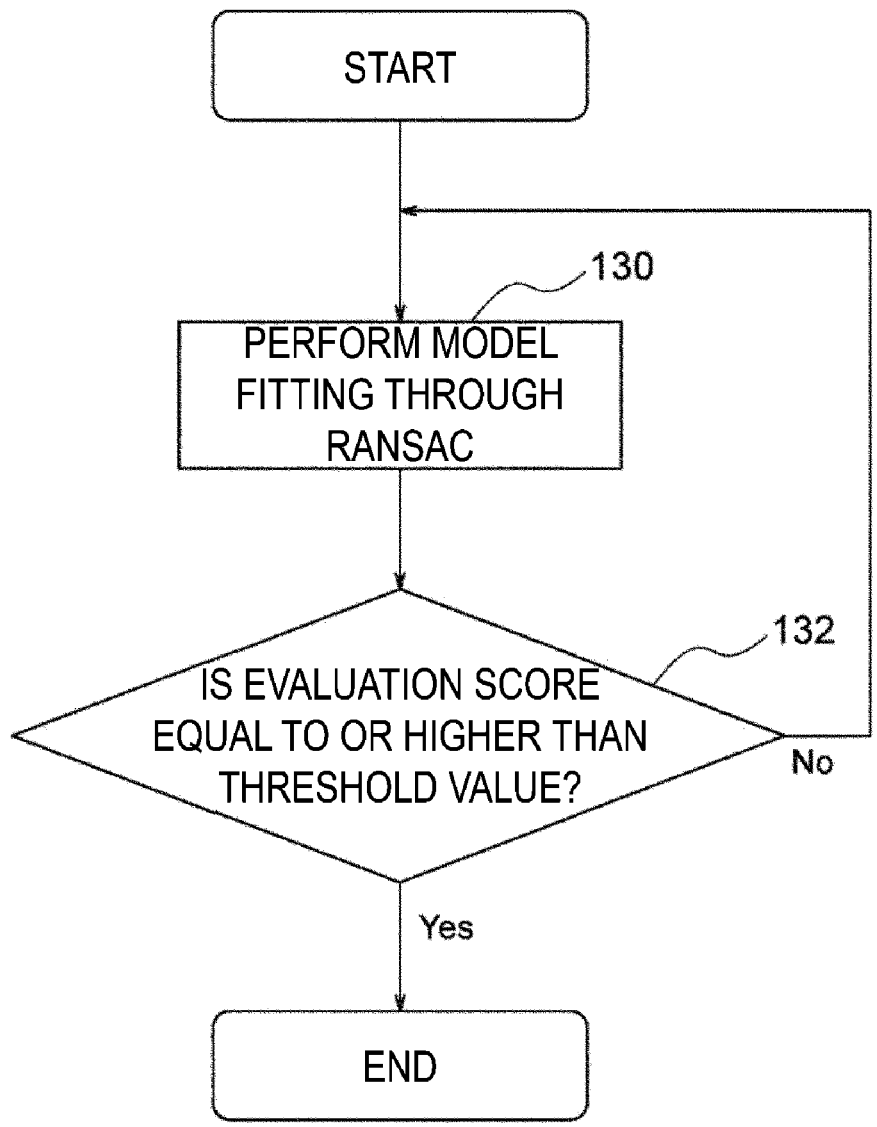
FIG. 17 is a flowchart illustrating an example of a flow of a process of estimating a model in a program according to the first embodiment.

A process of step S104 is realized by the process routine illustrated in FIG. 17.

In step S130, the linear structure estimation unit 24 estimates the model parameter of the linear structure represented by the point cloud cluster through RANSAC based on the local effective length estimated for each of the point cloud clusters and the estimated central axis direction. In this case, the model parameter with which the evaluation score of the evaluation function shown in Equation (3) or (4) above is maximized is estimated.

In step S132, a determination is made as to whether or not a maximum evaluation score calculated in step S130 is equal to or higher than a threshold value. When the maximum evaluation score is equal to or higher than the threshold value, the model parameter finally estimated in step S130 is used as an estimation result of the model parameter of the linear structure represented by the point cloud cluster. On the other hand, when the maximum evaluation score is lower than the threshold value, the process returns to step S130.

As described above, the point cloud analysis device according to the first embodiment estimates the local effective length that is a length when a length of projection of the point cloud cluster in the central axis direction is interpolated by an amount of the loss part of the point cloud based on the estimated central axis direction and the interval between the scan lines for each point cloud cluster. Thus, the effective length of the measurement point cloud in consideration of the scan line interval can be estimated accurately.

Further, it is possible to accurately estimate the model parameter representing the linear structure from the point cloud by considering the effective length. Further, it is possible to curb an influence of a relative position, posture, or the like between the measurement unit and the linear structure that is a measurement target, and to improve detection accuracy of the linear structure. Further, it is possible to curb the linear structure being estimated at a wrong position by considering a constraint condition regarding a positional relationship with the surrounding facilities.

Second Embodiment

Overview of Point Cloud Analysis Device According to Second Embodiment

A detection loss of linear structures is likely to occur when a plurality of linear structures are in the vicinity. For example, when the distance threshold value is not set appropriately, it may be erroneously estimated that there is one linear structure when a plurality of linear structures are in the vicinity. In particular, it is difficult for an evaluation score of a short linear structure to increase, it is easy for detection loss to occur.

Figure 18:
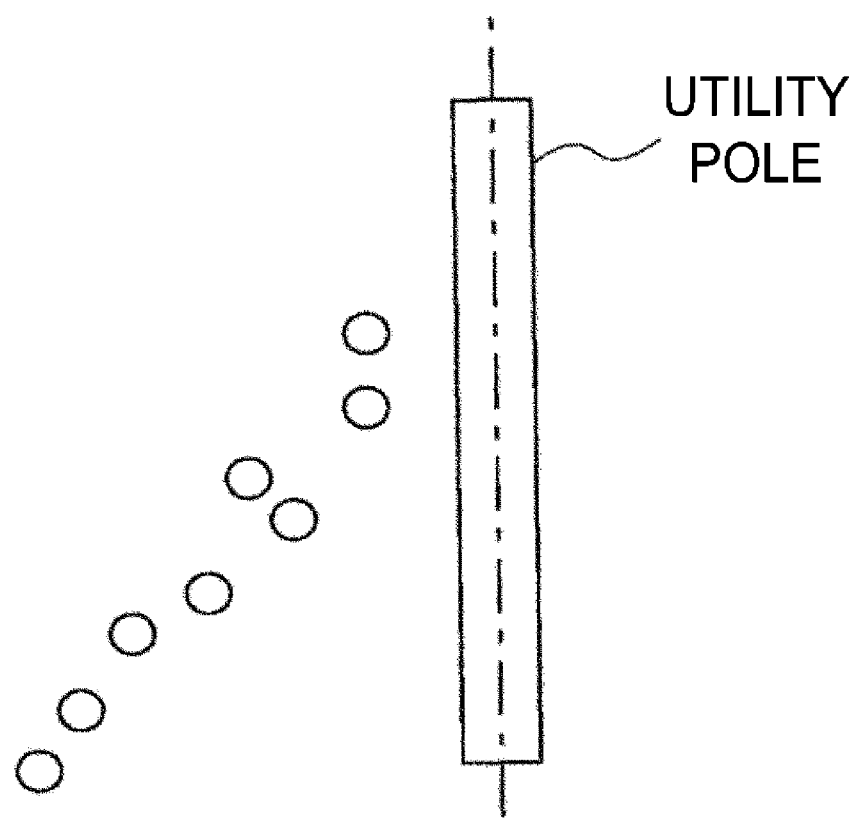
FIG. 18 is a diagram illustrating an example of a result of measuring a point cloud.

Specifically, when a point cloud as illustrated in FIG. 18 is measured, it is unclear why it is difficult to approximate the point cloud as a single straight line or curve. Further, when the distance threshold value is increased, it is easy to estimate that there is one linear structure. However, when the distance threshold value is reduced, it is easy to be estimated that there are two linear structure.

Thus, in the second embodiment, facility information including the number of linear structures is used. Because the number of linear structures is known, it is possible to perform interpretation to determine whether variation in point cloud position due to the thickness of the linear structure (deviation from the straight line) occurs or variation in point cloud position due to the proximity of different measurement objects (dispersion in a direction perpendicular to the straight line) occurs.

Figure 19:
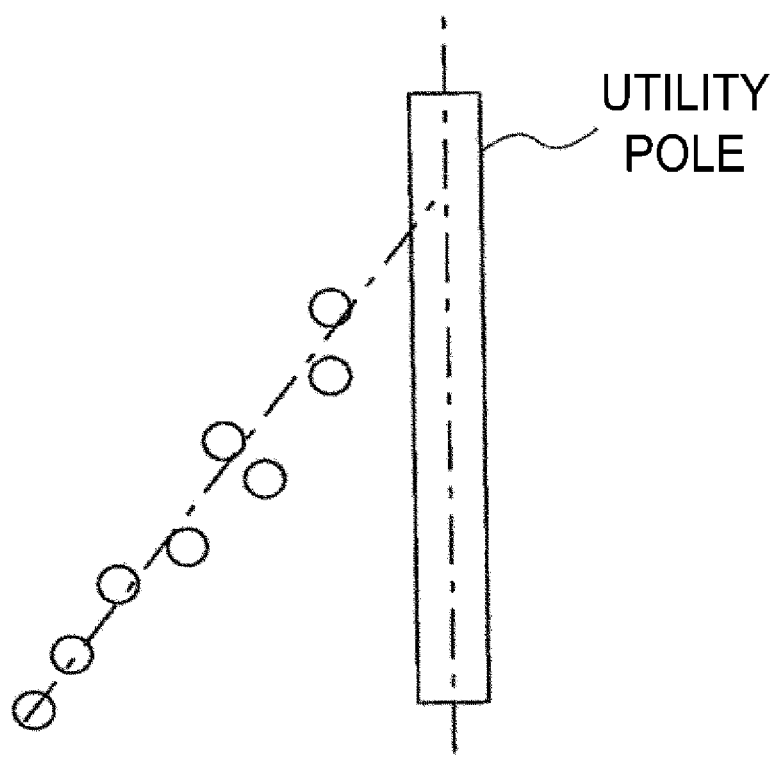
FIG. 19 is a diagram illustrating a method of estimating a model when only one linear structure is known.

For example, when only one linear structure is known as illustrated in FIG. 19, a determination can be made that the point cloud fluctuates (deviates from a straight line) due to a measurement error or the thickness of the linear structure, and the distance threshold value can be increased.

Figure 20:
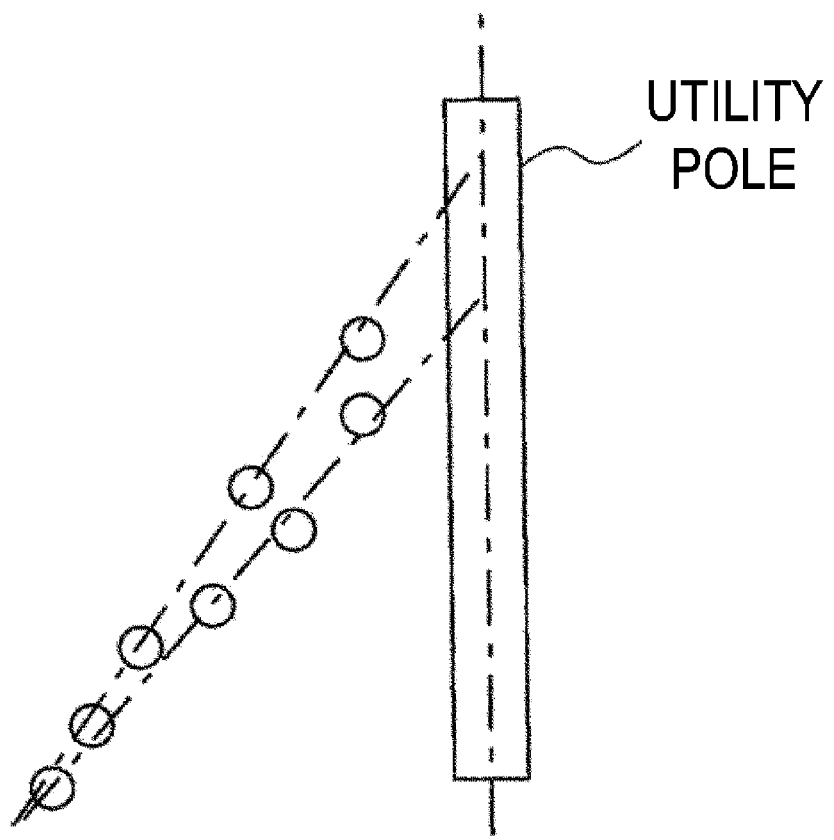
FIG. 20 is a diagram illustrating a method of estimating a model when two linear structures are known.

Further, when two linear structures are known as illustrated in FIG. 20, a determination can be made that it is difficult to approximate the linear structures as one curve because there are different objects.

Further, a plurality of linear structures are simultaneously estimated so that there is no problem even when the distance threshold value is increased. This is because the evaluation function uses the distance between the closest model and the point.

Specifically, an evaluation function of RANSAC for simultaneously estimating the model parameter for the number of the linear structures obtained from the facility information is set and the model parameter are estimated.

Configuration of Point Cloud Analysis Device According to Second Embodiment

Figure 21:
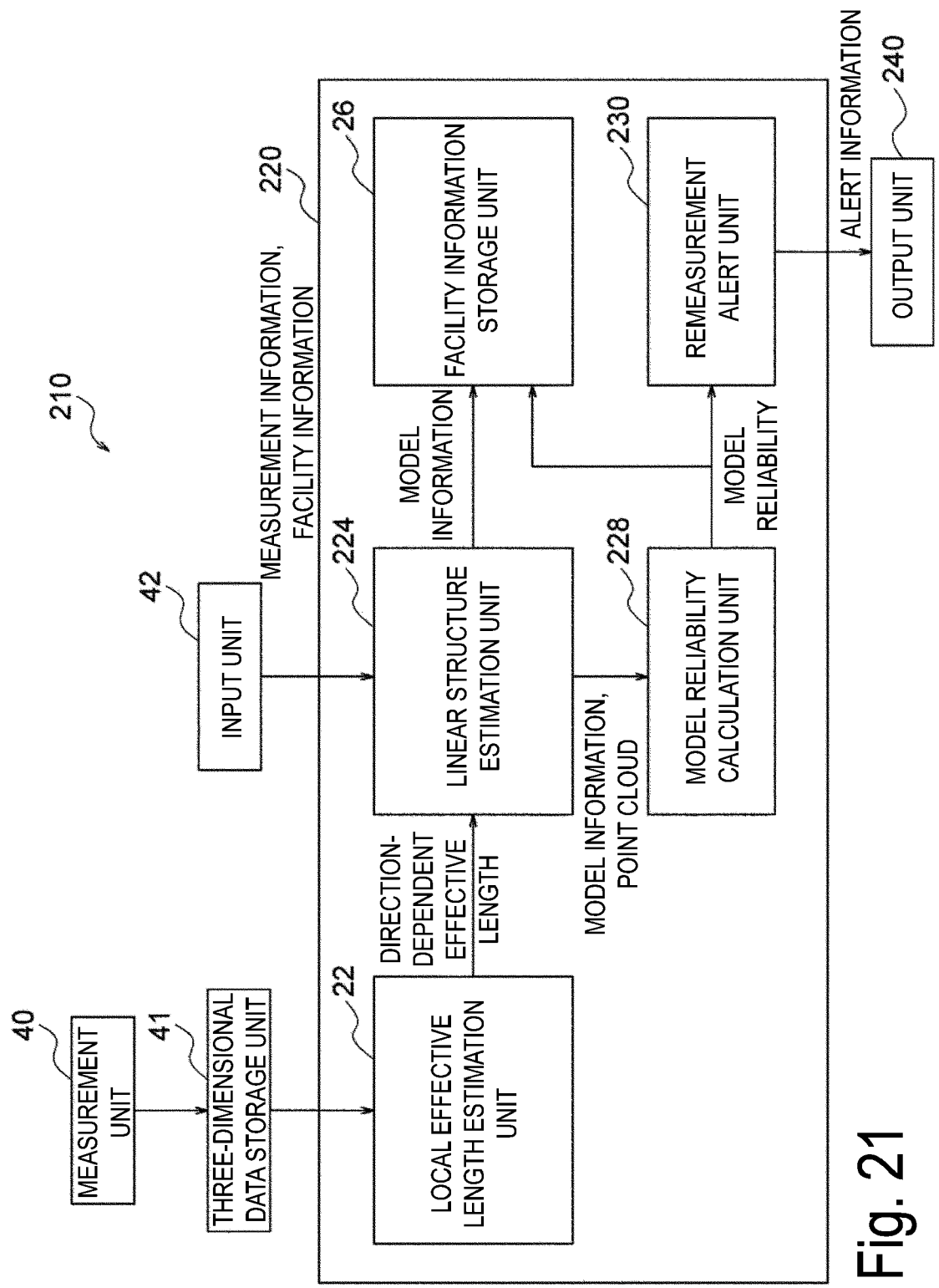
FIG. 21 is a block diagram illustrating an example of a functional configuration of a point cloud analysis device according to a second embodiment.

FIG. 21 is a block diagram illustrating an example of a functional configuration of a point cloud analysis device 210 according to a second embodiment.

As illustrated in FIG. 21, the point cloud analysis device 210 includes a calculation unit 220, a measurement unit 40, a three-dimensional data storage unit 41, and an input unit 42.

In the second embodiment, the measurement unit 40 uses an MMS in which a GPS and a laser range finder are mounted on a vehicle, to acquire a point cloud consisting of three-dimensional points, which is a measurement result of measuring the position on the surface of the object that is a subject.

The input unit 42 receives the measurement information and the facility information that are used in the point cloud analysis device 10 as inputs. The measurement information is, for example, a utility pole position and a cable position obtained in advance, and the facility information is the number of branch lines serving as linear structures obtained in advance for each utility pole.

The calculation unit 220 includes a local effective length estimation unit 22, a linear structure estimation unit 224, a facility information storage unit 26, a model reliability calculation unit 228, and a remeasurement alert unit 230.

The linear structure estimation unit 224 estimates the model parameter of the linear structure represented by the point cloud cluster through RANSAC based on the local effective length estimated for each of the point cloud clusters, the estimated central axis direction, and the number of linear structures.

Specifically, the linear structure estimation unit 224 estimates the model parameters corresponding the number of the linear structures so that a value of an evaluation function for simultaneously evaluating the model parameters corresponding to the number of linear structures, including the penalty term based on the positional relationship with the surrounding structure obtained in advance, is maximized.

Here, the evaluation function is expressed by the following equation.

[Math. 9]

$$J(P; \widetilde{M_S}) = \sum_{s=1}^{S} \sum_{i=1}^{N} (w_i \cdot \cos(\theta_{i,s}) \cdot \varsigma(q_i, M_s)) + \alpha \cdot E_{s=1}^{S} E(M_s) \quad (5)$$

Here, $M_s$ is a set of S models that are evaluation targets, P is a set of centroid positions of the point cloud cluster, $q_i$ is a centroid position of the i-th point cloud cluster, N is a total number of point cloud clusters, and S is the number of linear structures obtained from the facility information. Further, $w_i$ is a local effective length of the i-th point cloud cluster, and $\theta_{i,s}$ is an angle that formed by the central axis direction estimated for the i-th point cloud cluster and the central axis of the s-th model $M_s$ (a tangential direction at a position of $q_i$) (FIG. 10B).

$$\varsigma(q_i, M_s)$$

is a function that outputs 1 when a distance to the nearest model $M_s$ is equal to or smaller than a threshold value ε and otherwise outputs 0, for the nearest model $M_s$ with respect to the point $q_{i,s}$.

Such model parameters for the number of linear structures that the value of the evaluation function becomes the highest are simultaneously detected. However, when there is a linear structure that is not measured by the measurement unit 40 due to occlusion or the like, a plurality of models may be detected on the same linear structure not susceptible to the occlusion, instead of an original position of the linear structure. Such a redundant model is deleted in post-processing.

Next, a principle of calculation of the model reliability in the model reliability calculation unit 228 and alert in the remeasurement alert unit 230 will be described.

When there are many loss parts in the point cloud measured by the measurement unit 40, it is difficult to estimate the shape accurately even when the linear structure can be detected and thus, it is necessary to remeasure the point cloud, and an automatic alert function becomes important.

This is because the safety of facility is likely to be unable to be correctly determined when maintenance work is performed based on results that are technically difficult to estimate. Thus, it is necessary to output "reliability of the analysis result" and perform remeasurement in some cases.

That is, it is important to calculate the reliability in consideration of difficulty of technical prediction regarding estimation results that are highly likely to be incorrect depending on the measurement condition.

Thus, in the present embodiment, the length of the linear structure to be originally is estimated from the positional relationship between the utility pole and the ground, and a measurement rate is measured from the length and a measured area (line segment) of the point cloud.

Specifically, the measurement rate shown in the following equation is calculated as the model reliability, a determination is made as to whether remeasurement is to be performed based on the measurement rate, and alert information is output.

[Math. 10]

$$\text{Measurement rate} = L_{esti}/L_{pole} \quad (6)$$

Figure 22:
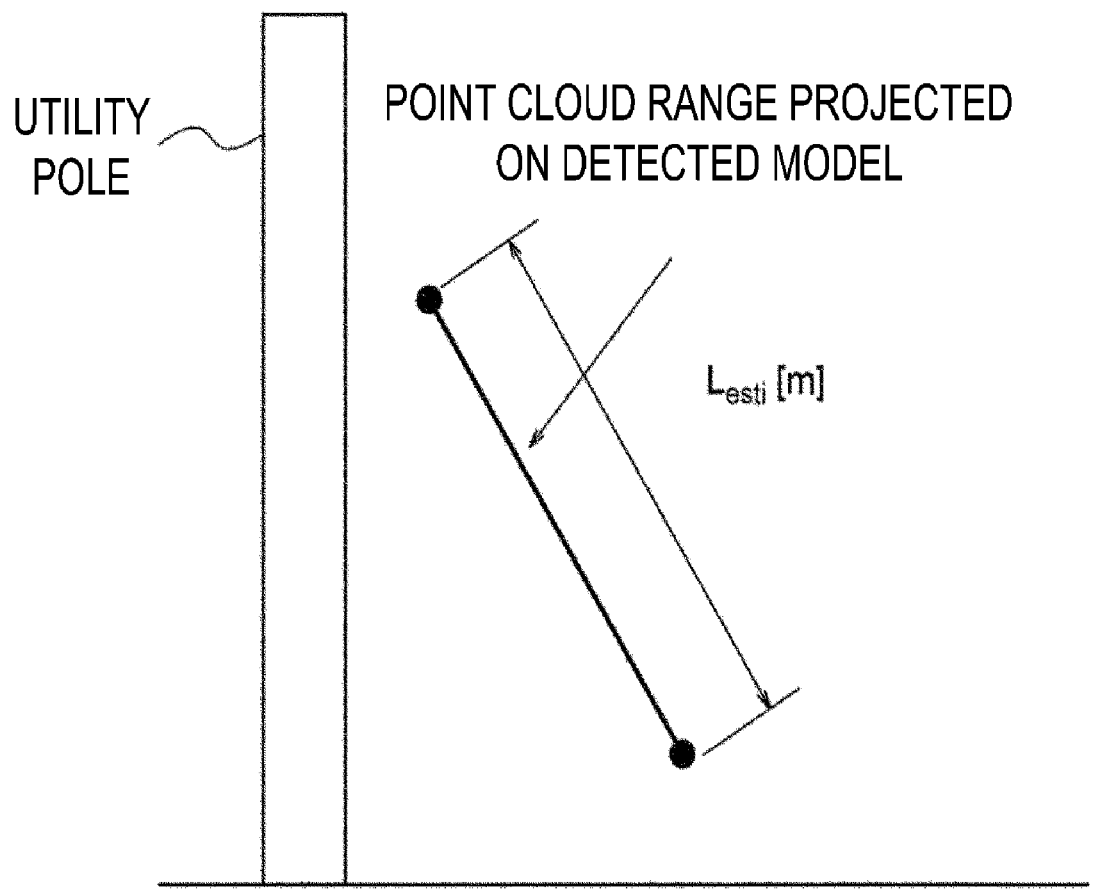
FIG. 22 is a diagram illustrating an example of a length of a detected model or a measured point cloud range.
Figure 23:
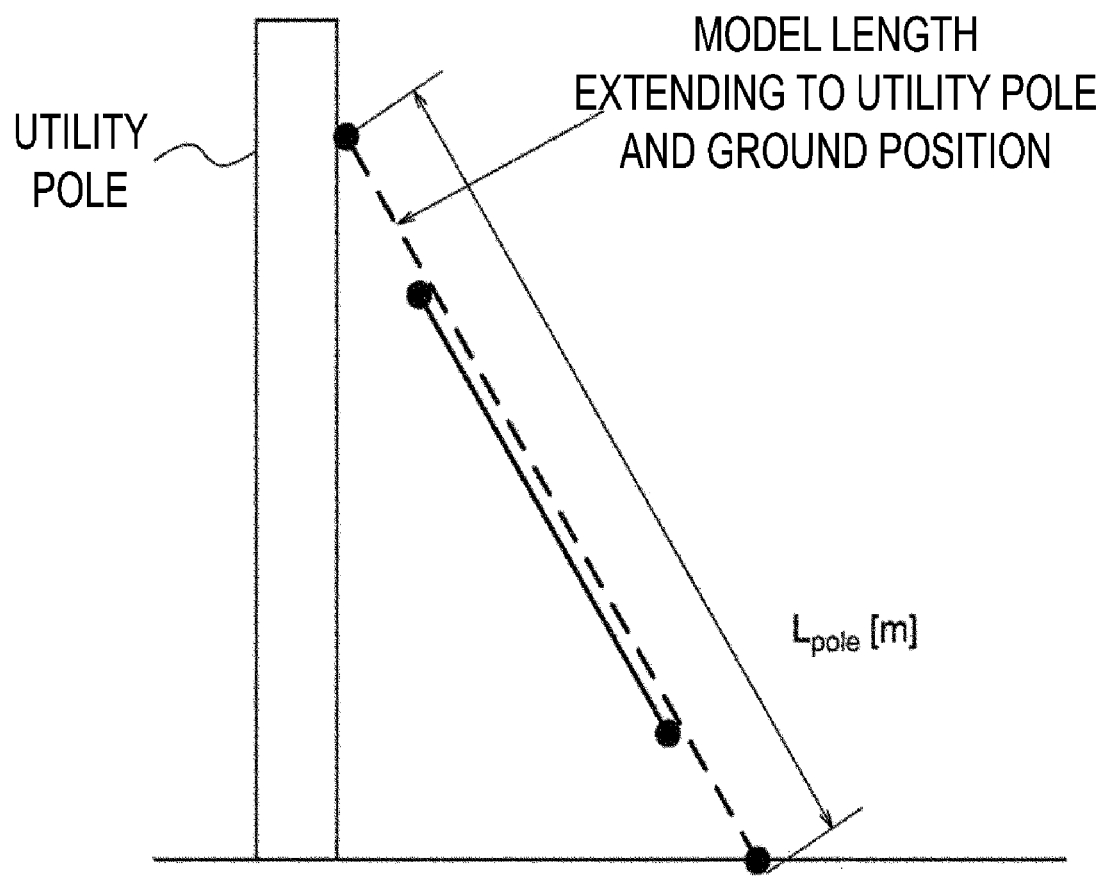
FIG. 23 is a diagram illustrating an example of a model length in which a length of the detected model or the measured point cloud range is extended to a utility pole and a ground position.

Here, $L_{esti}$ is a length when a range of detected surrounding point cloud of the model is projected onto the central axis of the model (FIG. 22). $L_{pole}$ is a model length when the above estimated model extends to the utility pole and a ground position (FIG. 23). That is, this means a total value of the line segments between endpoints of the model when endpoints of the curve model are changed to the ground and the utility pole position.

Specifically, this is the total value of the line segments when the point cloud within a distance [m] from the estimated model is projected onto the central axis of the model. c may be the same value as the distance threshold value when an evaluation score at the time of modeling obtained through RANSAC is determined, and in the present embodiment, ε=0.1 [m].

According to the above-described principle, in the present embodiment, the model reliability calculation unit 228 calculates a measurement rate as a model reliability according to Equation (6) above based on a length when a surrounding point cloud consisting of surrounding three-dimensional points is projected on the central axis of the linear structure represented by the estimated model parameter and a length when the linear structure represented by the estimated model parameter is extended to the surrounding structure obtained in advance.

The remeasurement alert unit 230 outputs, using the output unit 240, alert information for notifying that remeasurement of the measurement unit 40 is needed for the linear structure having model reliability equal to or smaller than a threshold value.

The point cloud analysis device 210 is realized by the computer 84 illustrated in FIG. 13 as an example. The computer 84 includes a CPU 86, a memory 88, a storage unit 92 that stores the program 82, a display unit 94 that includes a monitor, and an input unit 96 that includes a keyboard or a mouse. The CPU 86, the memory 88, the storage unit 92, the display unit 94, and the input unit 96 are connected to each other via a bus 98.

The storage unit 92 is realized by an HDD, an SSD, flash memory, or the like. The program 82 for causing the computer 84 to function as the point cloud analysis device 210 is stored in the storage unit 92. The CPU 86 reads the program 82 from the storage unit 92, loads the program 82 into the memory 88, and executes the program 82. The program 82 may be stored in a computer-readable medium and provided.

Operation of Point Cloud Analysis Device According to Second Embodiment

Figure 24:
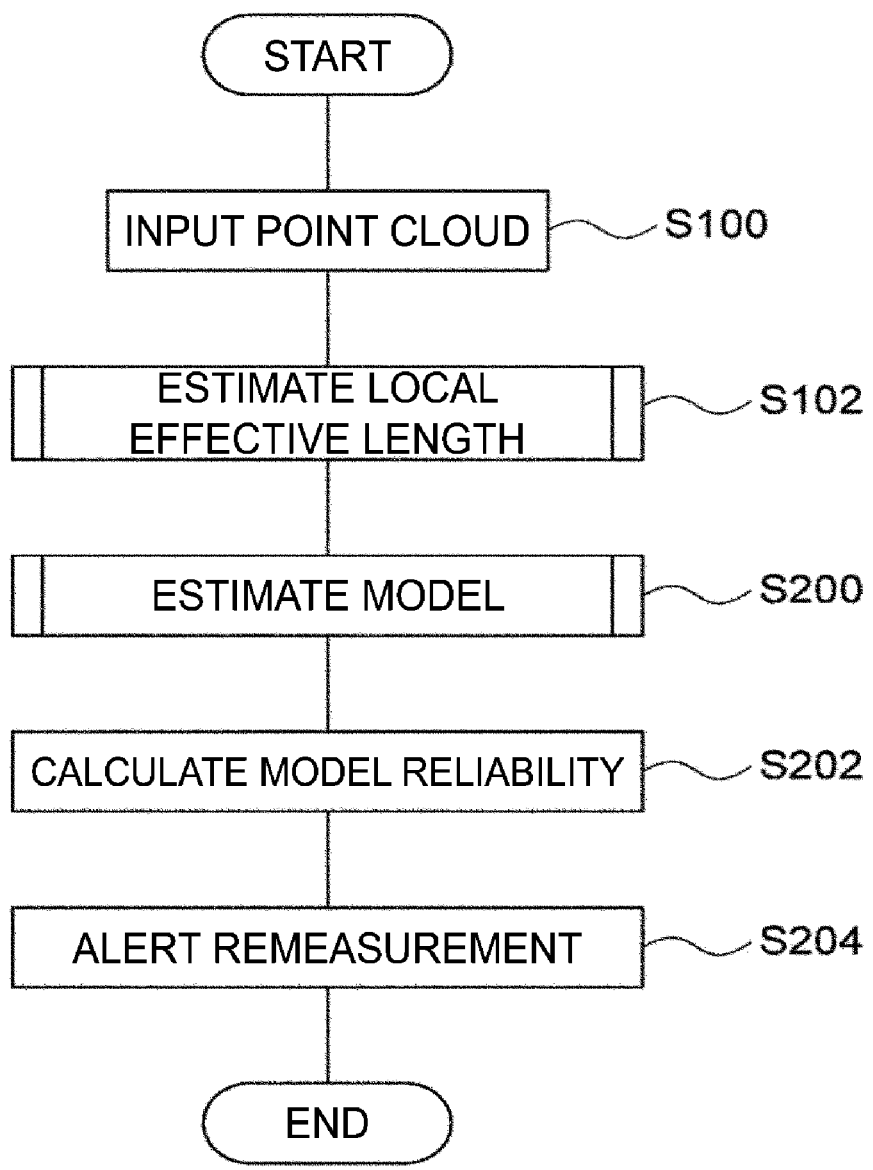
FIG. 24 is a flowchart illustrating an example of a flow of a process in a program according to the second embodiment.

Next, an operation of the point cloud analysis device 210 according to the second embodiment will be described with reference to FIG. 24. FIG. 24 is a flowchart illustrating an example of a flow of a process in the program 82 according to the second embodiment.

When the point cloud analysis device 210 according to the second embodiment is instructed to execute the point cloud analysis process according to an operation of an operator, the CPU 86 reads the program 82 stored in the storage unit 92 and executes the program 82.

First, in step S100 of FIG. 24, the local effective length estimation unit 22 acquires a point cloud consisting of three-dimensional points from the three-dimensional data storage unit 41.

In step S102, the local effective length estimation unit 22 estimates the distance $u_i$ of projection of the point cloud cluster in the central axis direction for each of the point cloud clusters obtained by clustering the point clouds, increases the projection distance $u_i$ by an amount of the loss region (line segment) of the point cloud from the scan line interval and the projection distance $u_i$ to estimate a local effective length.

In step S200, the linear structure estimation unit 224 uses the local effective length estimated for each of the point cloud clusters, the measurement information, and the number of linear structures obtained from the facility information to estimate the model parameter for the number of the linear structures through RANSAC.

In step S202, the model reliability calculation unit 228 calculates the measurement rate as the model reliability according to Equation (6) above based on the length when the surrounding point cloud consisting of surrounding three-dimensional points is projected on the central axis of the linear structure represented by the estimated model parameter and the length when the linear structure represented by the estimated model parameter is extended to the surrounding structure obtained in advance.

In step S204, the remeasurement alert unit 230 outputs, using the output unit 240, alert information for notifying that remeasurement of the measurement unit 40 is needed for the linear structure having model reliability equal to or smaller than a threshold value.

Figure 25:
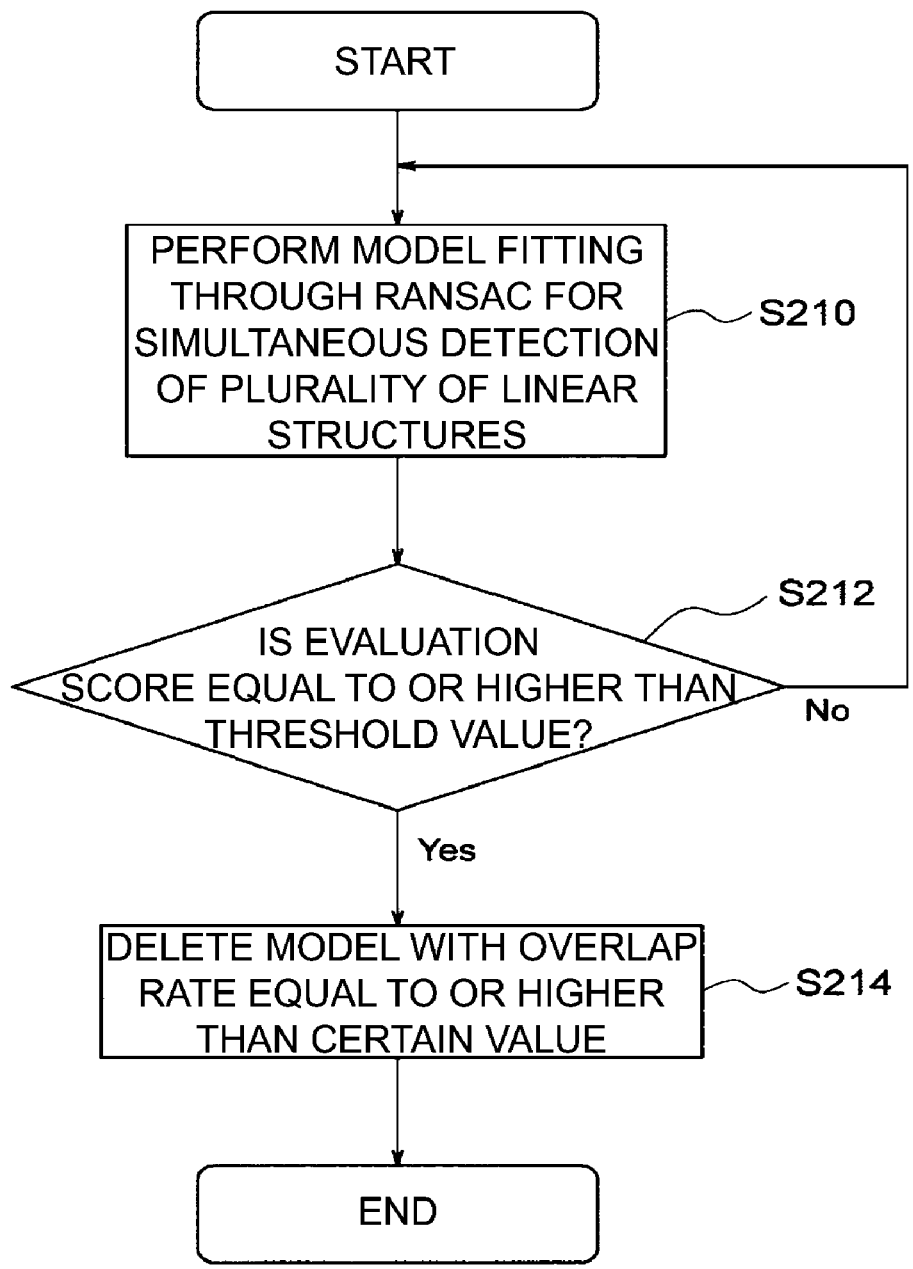
FIG. 25 is a flowchart illustrating an example of a flow of a process of estimating a model in a program according to the second embodiment.

Step S200 is realized by a process routine illustrated in FIG. 25.

In step S210, the linear structure estimation unit 224 estimates the model parameter of the linear structure represented by the point cloud cluster through RANSAC based on the local effective length estimated for each of the point cloud clusters, the estimated central axis direction, the measurement information, and the number of linear structures obtained from the facility information. In this case, the model parameters for the number of linear structures in which the evaluation score of the evaluation function shown in Equation (5) above is maximized are simultaneously estimated.

In step S212, the linear structure estimation unit 224 determines whether or not the maximum evaluation score calculated in step S210 is equal to or higher than the threshold value. When the maximum evaluation score is equal to or higher than the threshold value, the model parameter finally estimated in step S210 is used as an estimation result of the model parameter of the linear structure represented by the point cloud cluster. On the other hand, when the maximum evaluation score is lower than the threshold value, the process returns to step S210.

In step S214, the linear structure estimation unit 224 deletes the model parameter of the linear structure having an overlap rate with other linear structures which is equal to or higher than a certain level.

As described above, the point cloud analysis device according to the second embodiment uses the number of linear structures for each utility pole obtained in advance to simultaneously estimate model parameters representing the linear structures corresponding to the number of linear structures from the point cloud. Thus, it is possible to estimate the model parameter representing the linear structure with high accuracy. Thus, it is possible to curb detection loss of adjacent linear structures.

Further, by setting the evaluation function for simultaneously estimating the model parameters of a plurality of linear structures, it is possible to avoid a local solution and it is easy for an optimum solution to be obtained. Further, it is possible to estimate the model parameter of the linear structure accurately due to low susceptibility to the distance threshold value of RANSAC.

Further, it is possible to avoid a problem of estimation of the number of linear structures using the number of linear structures obtained from the facility information, and it is possible to curb detection loss of adjacent linear structures even when linear structure has a small number of measurement points.

Further, the reliability of the estimated linear structure is calculated from a geometrical relationship between the utility pole and the ground, a determination is made as to whether or not remeasurement is performed, and alert is performed. This makes it possible to present information indicating that remeasurement is to be performed when reliability of the estimated linear structure model is low.

The point cloud analysis device and method have been illustrated and described above as embodiments. The embodiment may be in the form of a program for causing the computer as each unit included in the point cloud analysis device. The embodiment may be in the form of a storage medium that can be read by the computer that stores this program.

In addition, a configuration of the point cloud analysis device described in the embodiment is an example, and may be changed depending on a situation without departing from the gist.

Further, the flow of the process of the program described in the embodiment is also an example, and unnecessary steps may be deleted, new steps may be added, or a processing order may be changed without departing from the gist.

Further, in the embodiment, a case in which the process according to the embodiment is realized by a software configuration using a computer by a program being executed has been described, but the present invention is not limited thereto. The embodiment may be realized by, for example, a hardware configuration or a combination of a hardware configuration and a software configuration.

REFERENCE SIGNS LIST 10, 210 Point cloud analysis device
20, 220 Calculation unit
22 Local effective length estimation unit
24, 224 Linear structure estimation unit
26 Facility information storage unit
30 Clustering unit
32 Central axis direction estimation unit
34 Direction-dependent local effective length estimation unit
40 Measurement unit
41 Three-dimensional data storage unit
42 Input unit
82 Program
84 Computer
228 Model reliability calculation unit
230 Remeasurement alert unit
240 Output unit

The invention claimed is:

1. A point cloud analysis device for estimating presence or absence of a linear structure or/and a region in which the linear structure is present from point cloud data obtained by measuring a real space, the point cloud analysis device comprising:
a linear structure estimator configured to estimate the presence or absence of the linear structure or/and the region in which the linear structure is present from the point cloud data using a property in the real space common to the linear structure,
wherein the property includes a length of the linear structure and a relationship between divided regions when the linear structure is divided into predetermined units,
a three-dimensional data store configured to store a point cloud representing three-dimensional points;
a cluster configured to cluster the point clouds to obtain a point cloud cluster;
a central axis direction estimator configured to estimate a central axis direction based on the point cloud cluster; and
a direction-dependent local effective length estimator configured to estimate a local effective length for each of the point cloud clusters and the estimated central axis direction, the local effective length being a length when a length of projection of a point cloud belonging to the point cloud cluster in the central axis direction is interpolated by an amount of a loss part of the point cloud,
wherein the linear structure estimator uses the local effective length as a length of the linear structure to estimate a model parameter representing a region in which the linear structure is present.

2. The point cloud analysis device according to claim 1, wherein the linear structure estimator further uses a relationship between the linear structure and a ground in the real space, or a relationship between the linear structure and an artificial structure present near the linear structure.

3. The point cloud analysis device according to claim 1, wherein the linear structure estimator estimates the model parameter representing the region in which the linear structure represented by the point cloud cluster is present based on the local effective length estimated for each of the point cloud clusters and the estimated central axis direction.

4. The point cloud analysis device according to claim 3, wherein the linear structure estimator uses an evaluation function for evaluating the model parameter, including a penalty term based on a positional relationship between the surrounding structure obtained in advance and the linear structure represented by the point cloud cluster to estimate the model parameter of the linear structure represented by the point cloud cluster.

5. The point cloud analysis device according to claim 3, wherein the linear structure estimator simultaneously estimates model parameters of the linear structure corresponding to the number of the linear structures using the number of nearby linear structures obtained in advance.

6. The point cloud analysis device according to claim 3, further comprising:
a model reliability determiner configured to determine model reliability based on a length of a range of a surrounding point cloud consisting of three-dimensional points around the linear structure represented by the estimated model parameter and a length when the linear structure represented by the estimated model parameter is extended to a surrounding structure obtained in advance, and
a remeasurement alerter configured to notify that remeasurement of point cloud data is necessary for a linear structure having the model reliability which is equal to or lower than a threshold value.

7. A point cloud analysis method performed by a point cloud analysis device for estimating presence or absence of a linear structure or/and a region in which the linear structure is present from point cloud data obtained by measuring a real space, the point cloud analysis method comprising:
estimating, by a linear structure estimator, the presence or absence of the linear structure or/and the region in which the linear structure is present from the point cloud data using a property in the real space common to the linear structure,
wherein the property includes a length of the linear structure and a relationship between divided regions when the linear structure is divided into predetermined units,
storing a point cloud representing three-dimensional points;
clustering the point clouds to obtain a point cloud cluster;
estimating a central axis direction based on the point cloud cluster; and
estimating a local effective length for each of the point cloud clusters and the estimated central axis direction, the local effective length being a length when a length of projection of a point cloud belonging to the point cloud cluster in the central axis direction is interpolated by an amount of a loss part of the point cloud,
wherein the linear structure estimator uses the local effective length as a length of the linear structure to estimate a model parameter representing a region in which the linear structure is present.

8. A computer-readable non-transitory recording medium storing computer-executable program instructions for estimating presence or absence of a linear structure or/and a region in which the linear structure is present from point cloud data obtained by measuring a real space, the program instructions when executed by a processor cause a computer system to:

estimate, by a linear structure estimator, the presence or absence of the linear structure or/and the region in which the linear structure is present from the point cloud data using a property in the real space common to the linear structure, wherein the property includes a length of the linear structure and a relationship between divided regions when the linear structure is divided into predetermined units, storing, by a three-dimensional data store, a point cloud representing three-dimensional points;

clustering, by a cluster, the point clouds to obtain a point cloud cluster;

estimating, by a central axis direction estimator a central axis direction based on the point cloud cluster; and estimating, by a direction-dependent local effective length estimator configured to estimate a local effective length for each of the point cloud clusters and the estimated central axis direction, the local effective length being a length when a length of projection of a point cloud belonging to the point cloud cluster in the central axis direction is interpolated by an amount of a loss part of the point cloud, wherein the linear structure estimator uses the local effective length as a length of the linear structure to estimate a model parameter representing a region in which the linear structure is present.

9. The point cloud analysis method according to claim 7, wherein the linear structure estimator further uses a relationship between the linear structure and a ground in the real space, or a relationship between the linear structure and an artificial structure present near the linear structure.

10. The point cloud analysis method according to claim 7, wherein the linear structure estimator estimates the model parameter representing the region in which the linear structure represented by the point cloud cluster is present based on the local effective length estimated for each of the point cloud clusters and the estimated central axis direction.

11. The point cloud analysis method according to claim 10, wherein the linear structure estimator uses an evaluation function for evaluating the model parameter, including a penalty term based on a positional relationship between the surrounding structure obtained in advance and the linear structure represented by the point cloud cluster to estimate the model parameter of the linear structure represented by the point cloud cluster.

12. The point cloud analysis method according to claim 10, wherein the linear structure estimator simultaneously estimates model parameters of the linear structure corresponding to the number of the linear structures using the number of nearby linear structures obtained in advance.

13. The point cloud analysis method according to claim 10, the method further comprising:

determining, by a model reliability determiner, model reliability based on a length of a range of a surrounding point cloud consisting of three-dimensional points around the linear structure represented by the estimated model parameter and a length when the linear structure represented by the estimated model parameter is extended to a surrounding structure obtained in advance, and notifying, by a remeasurement alerter, that remeasurement of point cloud data is necessary for a linear structure having the model reliability which is equal to or lower than a threshold value.

14. The computer-readable non-transitory recording medium of claim 8, wherein the linear structure estimator further uses a relationship between the linear structure and a ground in the real space, or a relationship between the linear structure and an artificial structure present near the linear structure.

15. The computer-readable non-transitory recording medium of claim 8, wherein the linear structure estimator estimates the model parameter representing the region in which the linear structure represented by the point cloud cluster is present based on the local effective length estimated for each of the point cloud clusters and the estimated central axis direction.

16. The computer-readable non-transitory recording medium of claim 15, wherein the linear structure estimator uses an evaluation function for evaluating the model parameter, including a penalty term based on a positional relationship between the surrounding structure obtained in advance and the linear structure represented by the point cloud cluster to estimate the model parameter of the linear structure represented by the point cloud cluster.

17. The computer-readable non-transitory recording medium of claim 15, wherein the linear structure estimator simultaneously estimates model parameters of the linear structure corresponding to the number of the linear structures using the number of nearby linear structures obtained in advance, and the computer-executable program instructions when executed further causing the system to:

determine, by a model reliability determiner, model reliability based on a length of a range of a surrounding point cloud consisting of three-dimensional points around the linear structure represented by the estimated model parameter and a length when the linear structure represented by the estimated model parameter is extended to a surrounding structure obtained in advance, and notify, by a remeasurement alerter, that remeasurement of point cloud data is necessary for a linear structure having the model reliability which is equal to or lower than a threshold value.

* * * * *